United States Patent [19]

Takahashi et al.

[11] Patent Number: 5,768,117
[45] Date of Patent: Jun. 16, 1998

[54] POWER SUPPLY SYSTEM FOR SUPPLYING ELECTRIC POWER TO A LOAD THROUGH PLURAL CONVERTERS

[75] Inventors: Tadashi Takahashi; Kenichi Onda, both of Hitachi; Akihiko Kanouda, Hitachinaka; Masayoshi Sato; Hideaki Horie, both of Hitachi; Katsunori Hayashi, Odawara, all of Japan

[73] Assignee: Hitachi, Ltd., Japan

[21] Appl. No.: 364,771

[22] Filed: Dec. 27, 1994

[30] Foreign Application Priority Data

Dec. 27, 1993 [JP] Japan ............... 5-331022

[51] Int. Cl.⁶ .................................. H02M 7/155
[52] U.S. Cl. .................. 363/65; 363/78; 307/82
[58] Field of Search ................... 363/50, 65, 67, 363/78, 84, 89, 123, 125; 307/43, 52, 53, 60, 69, 82

[56] References Cited

U.S. PATENT DOCUMENTS

| | | | |
|---|---|---|---|
| 4,384,321 | 5/1983 | Rippel | 363/124 |
| 4,788,449 | 11/1988 | Katz | 307/43 |
| 5,003,453 | 3/1991 | Tighe et al. | 363/65 |
| 5,157,269 | 10/1992 | Jordan et al. | 307/59 |
| 5,207,613 | 5/1993 | Ferchau et al. | 454/184 |
| 5,418,707 | 5/1995 | Shimer et al. | 363/65 |
| 5,428,523 | 6/1995 | McDonnal | 363/71 |
| 5,477,132 | 12/1995 | Canter et al. | 323/282 |
| 5,521,809 | 5/1996 | Ashley et al. | 363/71 |

FOREIGN PATENT DOCUMENTS

| | | |
|---|---|---|
| 0 156 724 | 10/1985 | European Pat. Off. . |
| 0 498 646 | 8/1992 | European Pat. Off. . |
| 0 553 824 | 8/1993 | European Pat. Off. . |
| 30 03 907 | 8/1981 | Germany . |
| 94 08 978.7 | 9/1994 | Germany . |
| 27415 | 3/1976 | Japan . |
| 31371 | 2/1987 | Japan . |
| 140632 | 6/1988 | Japan . |
| 2700743 | 10/1989 | Japan . |

OTHER PUBLICATIONS

Technical Report: IEICE (the Institute of Electronics, Information and Communication Engineers) PE 92–47, "Control Scheme for Parallel Operation Control of DC/DC Converters", pp. 23–29 (1992/11).

Primary Examiner—Adolf Berhane
Attorney, Agent, or Firm—Evenson, McKeown, Edwards & Lenahan, P.L.L.C.

[57] ABSTRACT

The invention relates to a power supply system having plural converters connected in parallel. The current of each of the plural converters is detected and each of the converters is controlled so as to match each of the converters to a maximum current value from among the detected current values. In the parallel converters, when one or more converter fails, having an output current of zero, the remaining converters are each partially charged equally to maintain the load current. Since a common bus is arranged between plural converters and plural loads, it is possible to carry out a redundant operation having a high reliability. Since a stable output can be obtained without being affected by the failed converter, a power supply system having the redundancy and the high reliability can be attained.

19 Claims, 15 Drawing Sheets

FIG. 3

| METHOD | (a) PRESENT INVENTION | (b) PRIOR ART | (c) PRIOR ART |
|---|---|---|---|
| | MAXIMUM CURRENT | AVERAGE CURRENT | OVERFLOW |
| CONSTRUCTION | DETECTION CURRENT → CONTROL LINE | DETECTION CURRENT → CONTROL LINE | POWER SUPPLY 1 / POWER SUPPLY 2 |
| FEATURE | CURRENT OF EACH CONVERTER IS MATCHED TO MAXIMUM VALUE | CURRENT OF EACH CONVERTER IS MATCHED TO AVERAGE VALUE | CURRENT CONTROL FOR POWER SUPPLY IS NOT PERFORMED |
| CURRENT BALANCE | ○ | ○ | × |
| FAILURE DETECTION | UNNECESSARY | NECESSARY | UNNECESSARY |
| VOLTAGE FLUCTUATION | ○ | △ | × |
| FAILURE AS LEFT | ○ | × (CUT-OFF BY SW) | ○ |

POWER SUPPLY SYSTEM FOR SUPPLYING ELECTRIC POWER TO A LOAD THROUGH PLURAL CONVERTERS

BACKGROUND AND OF THE INVENTION

The present invention relates to a power supply system for supplying the electric power to a load or plural loads through plural AC/DC parallel operating converters for converting alternating current to direct current having a predetermined voltage, or plural DC/DC parallel converters for converting direct current to the other direct current having a predetermined voltage.

A conventional power supply system having parallel operating converters is disclosed in, for example, Japanese patent laid-open publication No. 270743/1989, Japanese patent laid-open publication No. 27415/1976, and/or Japanese patent laid-open publication No. 140632/1988.

Further, an improved construction for a power factor of an alternative current side being an input of a respective converter in a conventional power supply system is disclosed in, for example, Japanese patent laid-open publication No. 31371/1987.

In the above-stated prior power supply systems, parallel operation of redundant DC/DC converters is provided.

However, there is no consideration of countermeasures in case of a failure of some DC/DC converter among the plural DC/DC converters, and further there is no consideration of the reliability of the power supply system.

Besides, a technical report of IEICE (the Institute of Electronics, Information and Communication Engineers) PE 92-47, p.p. 23-29 (1992/11) "Control Scheme for Parallel Operation Control of DC/DC Converters" describes that both an average current control method and an overflow method in the parallel operating DC/DC converters have been performed commonly.

In the above stated technical report, two kinds of the current balance (a current partial charge) controls for the parallel operating converters are disclosed. One of the current balance controls is an average current control method, in which the current value of each converter is detected and matched with an average of the detected current values.

The second current balance control is an overflow method, in which each of the plural converters is connected merely in parallel operation arrangement.

However, in the average current control method, when a converter malfunctions, since an output current value of that converter becomes zero, the average current value of all converters decreases. Because the current value becomes low, it is impossible to generate the necessary current required by a load to the converters. Essentially, it is necessary to increase the current to the converters.

So as to solve the above problems in the average current control method, it is desirable to detect and cut off the failed (fault) converter from the parallel arrangement of converters, through a switching means etc. Further it is necessary to distribute the current of the remaining converters so as to match with the load.

In the overflow method (above), each converter is merely connected in the parallel operation arrangement, and the current balance is limited according to a current limiter of each converter. The current value is therefore not balanced and accordingly the voltage fluctuation becomes large.

Further, as stated above, a power factor improvement circuit at the alternative input side which is the input of the respective converter in the conventional power supply system, is proposed in Japanese patent laid-open publication No. 31371/1987. However, there is no construction in response to the plural alternative power supplies in this prior technique.

SUMMARY OF THE INVENTION

A main object of the present invention is to provide a power supply system comprising plural converters connected in parallel, which can provide a stable output power supply, without being affected by a failed converter.

A second object of the invention is to provide a superior redundancy and a high reliability in the power supply system.

A third object of the present invention is to provide a power supply system for a magnetic disk apparatus etc. having superior redundancy and high reliability.

A fourth object of the present invention is to provide a power supply system having a simplified power factor improvement circuit and a compact construction.

The above stated main object is attained by a power supply system to supply electric power to a load by means of parallel outputs of plural converters (electric power converters), which comprises a current detector for detecting an output current of each converter, a maximum value current detector for detecting a maximum value of the output current value among the output current values of the converters obtained through the current detection means, and a control for each converter so as to match the output current thereof with the maximum value of the output current.

In the power supply system according to the invention, an alternating current power supply is connected to a first common bus. An alternating current input from the first common bus is provided to plural rectifiers for conversion to direct current. The direct current output of the rectifiers is connected to a second common bus, which supplies a direct current input to plural DC/DC converters for converting to direct current having a predetermined voltage. A direct current output of the converter is connected via a third common bus to plural loads.

The above stated third object is attained by a power supply system having plural converters for supplying DC electric power to plural loads (such as a magnetic disk apparatus), and a control circuit. The loads are divided into plural groups, a first cluster comprising a first common bus for supplying a first group, a second cluster connecting plural of the first cluster, a second common bus for supplying commonly the electric power to the first cluster and the second cluster. Plural converters are connected to the common bus, and electric power is supplied through the classified common busses.

The above stated fourth object is attained by a power supply system which has a single power factor improvement circuit, which rectifies current from plural alternating current power supplies through each of rectifying means. Each rectified output is inputted to the power factor improvement circuit through each inductance. The power factor improvement circuit improves the power factor of each alternating current power supply by a switching operation at a higher frequency than that of the alternating current power supply through a switching element. An output from the power factor improvement circuit is supplied to plural converters as the electric power through a common bus.

The output current value of each converter is controlled to match the largest current value among the parallel converters. The current value of the converter having the smallest current increases, and the current value of the converter having a current larger value decreases.

Accordingly, the parallel converters are arranged to increase more than one number or two numbers. Even if a converter fails, and its output becomes zero, the remaining converters can take over the partial charge of the current, without being affected by the failed converter. As a result, failure detection of each converter and changing-over switching means are not needed to achieve stable current balance control in the power supply system.

Since plural elements constituting the power supply system are connected by the common bus at the input and the output portions, when a converter fails, by providing a certain relationship between the number of the elements and the load capacity (e.g. when the allowance failure number is h, the element number k is $(2+2h) \leq k \leq (8+2h)$), the capacity of the power supply system can be made at a minimum, and redundance operation having high reliability in the power supply system can be attained.

Further, according to the above stated means for attaining the third object, since plural magnetic disk apparatuses and plural converters for supplying direct current to the magnetic disk apparatuses are connected through plural classified common buses, the redundancy and the reliability in the power supply system can be improved and the compact construction for the apparatus in all can be attained.

Further, according to the above stated means for attaining the fourth object, in a case where plural alternating power supplies are required, with only one power factor improvement circuit, since the power factor in the power supply system can be improved, a compact apparatus can be obtained.

Other objects, advantages and novel features of the present invention will become apparent from the following detailed description of the invention when considered in conjunction with the accompanying drawings.

BRIEF DESCRIPTION OF THE DRAWINGS

FIG. 3 is a diagram comparing a feature of the present invention and that of prior techniques;

DETAILED DESCRIPTION OF THE DRAWINGS

Figure 1:
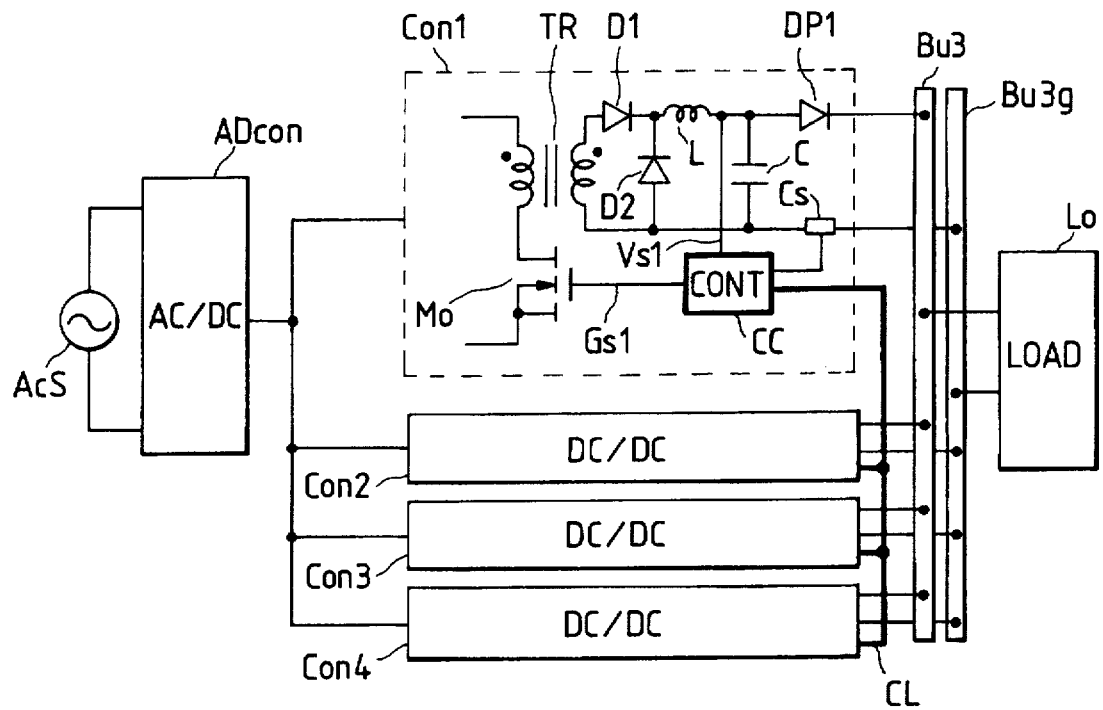
FIG. 1 is a schematic view showing one embodiment of a power supply system according to the present invention.

FIG. 1 is a block diagram showing one embodiment of a power supply system according to the present invention. ADcon indicates an AC/DC converter (a rectifying circuit) for converting the AC from an AC power supply AcS to direct current.

Each of elements con1–con4 is a DC/DC converter for outputting stable DC electric power by receiving the direct current from the AC/DC converter ADcon. Four such converters are provided in parallel. The direct current outputs from the DC/DC converters con1–con4 are given to a load Lo through a plus side and a minus side common buses Bu3 and Bu3g. Each of the DC/DC converters con1–con4 has respectively the same rated output current capacity.

Each of the DC/DC converters con1–con4 is a forward type converter. A main circuit of this converter comprises a semiconductor switching element Mo, which is connected to the primary side of a transformer TR, which is connected in series to a DC output side of the AC/DC converter ADcon. A smoothing circuit comprising a rectifying circuit having diodes D1 and D2 is connected to the secondary side of the transformer TR, together with a coil L, a condenser C and a diode DP1 for preventing a reverse current.

A control circuit (CONT) CC1 controls the switching element Mo through an output signal Gs1 according to the detection of an output voltage Vs1, to stabilize the detected output voltage Vs1 at a predetermined value.

Further, the magnitude of the output current of each of the respective DC/DC converters is detected by a current detector Cs, and input to the control circuit CC1, together with a control line CL (connected to each of the control units CC1–CCk) so as to cause the current of each converter to follow a maximum current value among the parallel converters.

Next, the control circuit CC1 will be explained in detail referring to FIG. 2, which shows the construction of the control circuit CC1 of FIG. 1. The detected value Cs1 of the output current of the converter is inputted to one input of operational amplifiers OP1 and OP2, and the control line CL is connected at the other input.

An output of the operational amplifier OP2 is connected to the control line CL through a diode D3. The output of the operational amplifier OP1 is compared with a standard voltage Rf and the converter output voltage Vs1, and a difference between them is inputted to a PWM circuit. The output signal Gs1 from the PWM circuit operates the semiconductor switching element Mo shown in FIG. 1.

Since each control circuit CC1–CCk of the DC/DC converter in the parallel operation arrangement is connected as shown in the figure, the largest current value among the plural converters appears in the control line CL.

Accordingly, each converter is controlled to output a current having a magnitude that is equal to the largest current value. At the same time, since each converter also includes a local voltage feedback control, the current value of the converter which provides the largest current value decreases. As a result, the current value of each converter is settled to a balanced state, thereby improving the current balance in the parallel arrangement of the converters.

Further, since redundancy is provided by connecting the plural loads and the plural converters commonly through a bus, if a converter fails, it is necessary to maintain consistent the operation of the remaining converters.

According to the present invention, even if the failed converter is left just as it is, the current value for carrying out the current control does not decrease, since it follows the maximum current value. Thus, the remaining converters can be partially charged to the load according to the control which follows the current value.

For example, in the construction shown in FIG. 1, four DC/DC converters having a rated output current capacity of 5 A are operated in parallel, and supply the current value of 15 A (the partial charge current of one converter is of 3.75 A) to the load.

If one converter fails, in the absence of current control, the respective circuits constituting the converters have a relative divergence of electric characteristic, so that the actual output voltage value is not always the same. Accordingly, the converter having the maximum output voltage value takes transitionally the partial charge of the current value of 7.5 A.

However, according to the present invention, the current value corresponding to the above-stated maximum current value appears on the control line CL. Since the output voltage of each converter is controlled to increase in response to the difference in current value of 3.75 A (=7.5 A−3.75 A), the partial charge current value of each converter is controlled to have the current value of 5 A.

In the above stated embodiment of the present invention, four DC/DC converters con1–con4 are employed in the power supply system, each having the same rated output current capacity of 5 A. As a result, the output current capacity of the four DC/DC converters con1–con4 is 20 A total. The output current capacity of the load, on the other hand, is 15 A.

Therefore, in the case of the embodiment, one converter having the rated output current capacity of 5 A is added to increase the output capacity of the power supply system above that necessary to provide an output current equal to the load capacity.

In another embodiment of the present invention, five converters can be employed in the power supply system, each having the same rated output current capacity of 5 A. As a result, the output current capacity of the five DC/DC converters has 25 A in all, compared with the current capacity of the load of 15 A. Therefore in this embodiment, two converters having the rated output current capacity of 5 A are added to increase in the capacity of power supply system relative to that of the load.

Next, the differences between the features according to the present invention and the features according to the conventional techniques will be explained referring to FIG. 3.

In the simplest conventional technique shown in item (c) in FIG. 3, the plural power supplies are operated merely in parallel, and no special control is carried out; this technique is therefore called "the overflow method". In this method, since the partial charge current responds to the impedance of each converter, the current balance is poor, and large voltage fluctuations are possible. On the other hand, however, when there is enough power supply capacity, even if a converter fails the power supply system can be left as it is.

Further, in the average current method according to the conventional technique shown in an item (b) in FIG. 3, the current output of each converter is controlled to match the average current of all converters as the standard value. However, in this average current method, if one of the parallel converters fails, so that the current output of the failed converter falls to zero, the standard value (the average current value) becomes low. Thus, when each converter is controlled by matching with this current value, the composed current value becomes lower and the power supply system can not provide the required load current.

Accordingly, in this average current method, when a converter fails, even if the remaining converters have enough capacity, the system can not carry out the normal operation. The failed converter is detected by a failure detection circuit etc., and then it is necessary to cut off the failed converter by a switching means or the like.

Figure 2:
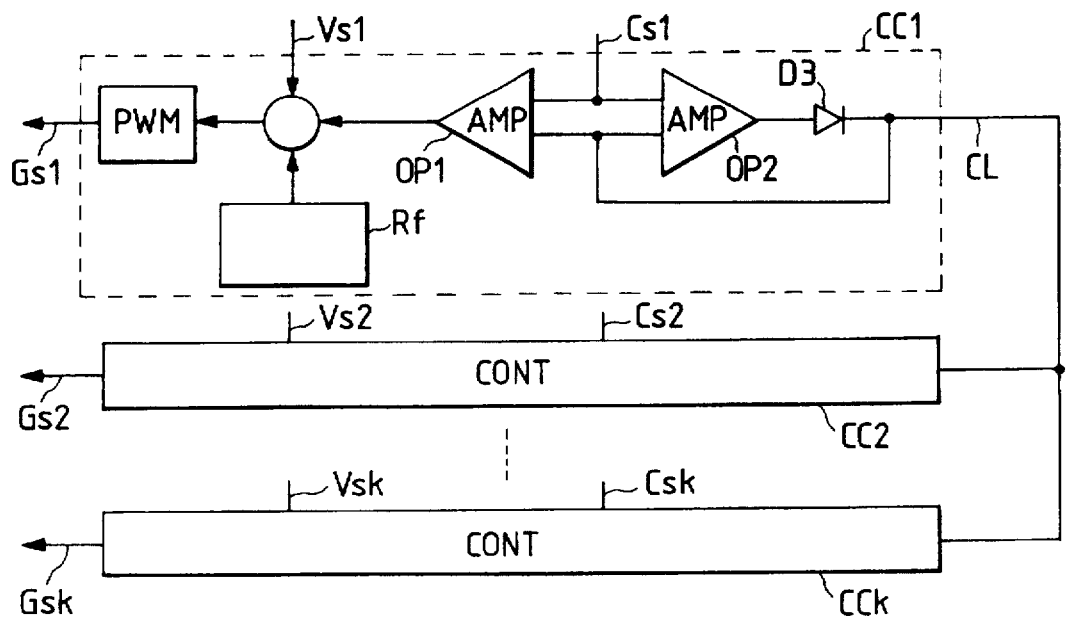
FIG. 2 is a detailed view showing a control circuit in the power supply system shown in FIG. 1.

According to the present invention, as explained in FIG. 1 and FIG. 2, since the maximum current value of each converter is used as the standard value for current control, even when one of the converters fails, the standard value for current control does not decrease, and the remaining converters can be partially charged to the load.

Further, in the case of a converter failure, a special circuit is not needed, even when the failed converter is left as is. That is, since the remaining converters have enough capacity, superior redundancy to continue normal operation of the power supply system can be obtained.

Further, in the embodiment shown in FIG. 1, a single AC/DC converter for converting the alternating current from the alternating power supply AcS supplies direct current to the plural DC/DC converters. However, a separate AC/DC converter may be provided respectively at a front stage of each DC/DC converter.

Figure 4:
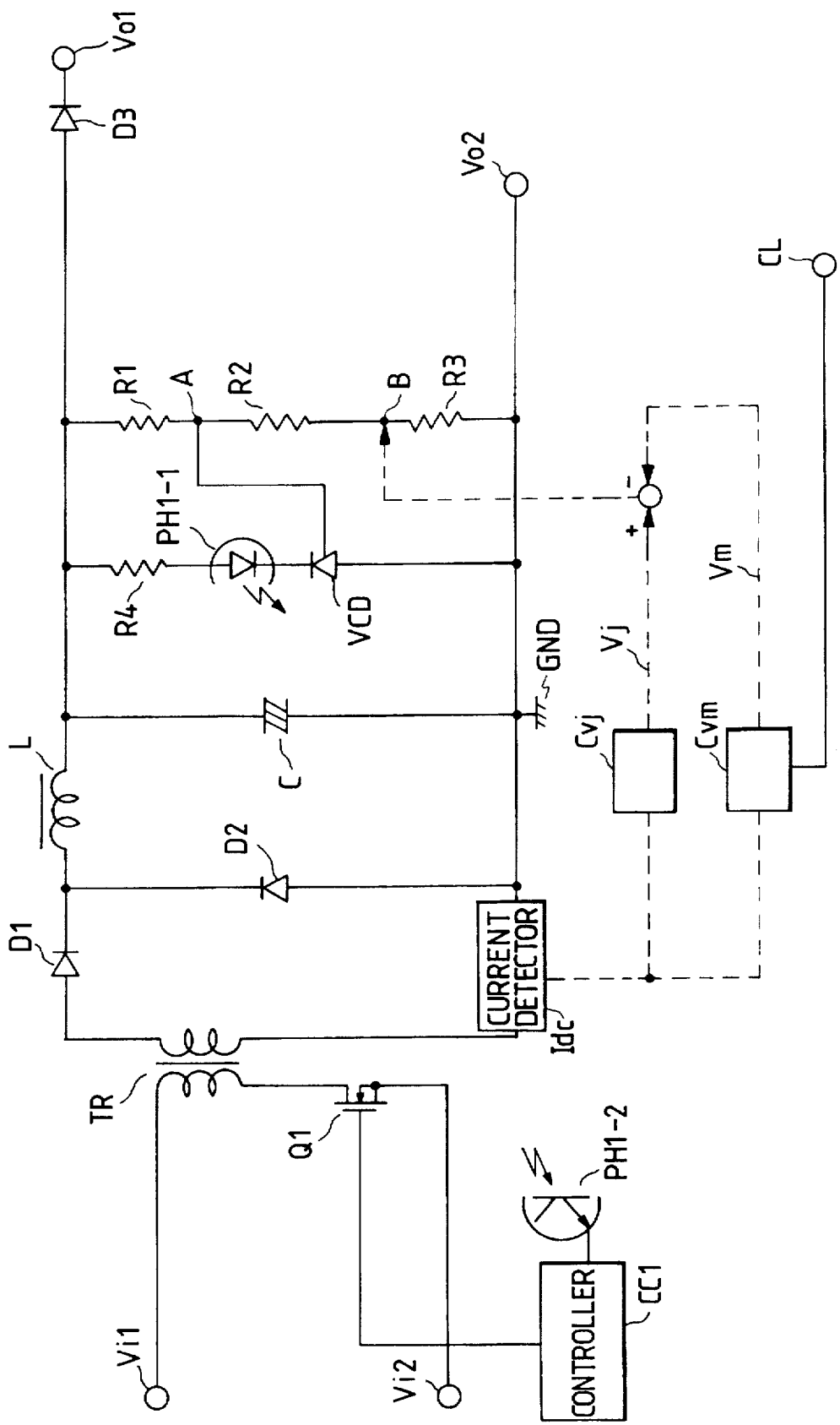
FIG. 4 is a circuit diagram showing a converter in FIG. 1.

FIG. 4 is a circuit diagram of the converters con1–con4 shown in FIG. 1 according to one embodiment of the present invention. In FIG. 1, control for the converter is carried out by detecting the magnitude of the smoothed direct current. However, since it is necessary to use a Hall element to detect such a smoothed direct current, there is a problem from an aspect of the cost. For this reason, an embodiment using a low cost current detector, such as a current transformer, will be explained. The current detector is installed between the secondary side of the transformer and the smoothing circuit, and detects pulsation in the current.

This example is a forward type DC/DC converter. The primary side of the transformer TR is connected to direct voltage terminals Vi1 and Vi2 through a switching element Q1. Further, the gate side of the switching element Q1 is connected to the secondary side of a photo-coupler PH1-2 through the PWM control circuit CC1. On the other hand, the secondary side of the transformer TR is connected to the diode D1, the inductance L and the condenser C. Further, a diode D2 is connected in series to the condenser C and the inductance L.

In the above-stated construction, by "on" and "off" operation of the switching element Q1, an AC voltage is generated at the secondary side of the transformer TR. This voltage is rectified and smoothed by the diodes D1 and D2, the inductance L and the condenser C, so that a DC voltage is obtained at the terminals of the condenser C.

To control this DC voltage at a constant value, a following voltage control circuit is connected in parallel to the condenser C, with a series circuit comprising a resistor R4, the photo-coupler PH1-1, an anode side and a cathode side of a three terminal regulator VCD, and a series circuit comprising resistors R1, R2 and R3 is connected in parallel thereto. A connecting point A of the resistors R1 and R2 is connected to a control terminal of the three terminal regulator VCD. A diode D3 is provided to prevent a reverse flow of the current in the event of a failure of one of plural parallel connected converters.

In the embodiment of FIG. 4, if the terminal voltage of the condenser C falls, then the voltage of the connecting point A between the resistors R1 and R2 also decreases. Further, since the control terminal voltage of the three terminal regulator VCD decreases, the current between the anode side and the cathode side of the three terminal regulator VCD decreases also, so that the current of the photo-couplers PH1-1 and PH1-2 falls. Therefore, the "on" and "off" duty of the output of the PWM control circuit CC1 increases, and the secondary voltage of the transformer TR works to increase, so that reduction of the terminal voltage of the condenser C is restrained.

When the terminal voltage of the condenser C rises, by the reverse of the above-stated operation, the "on" and "off" duty of the output of the PWM control circuit CC1 is made to decrease, thereby preventing the rise in the terminal voltage of the condenser C. The terminal voltage is thus controlled to a constant voltage.

In the present invention, a current control circuit is added to the above-stated voltage control circuit by means of the following method. The output of a current detection means Idc for detecting the alternating current of the secondary side of the transformer TR is input to a current detection circuit Cvj and a maximum current detection circuit Cvm, respectively.

The maximum current detection circuit Cvm has the control line CL and is connected to the other converters in the parallel operation arrangement. The maximum current detection circuit Cvm outputs a signal Vm equal to the larger of the values obtained from the control line CL and the current detection means Idc.

Next, the output voltage Vj of the current detection circuit Cvj is compared with the output voltage Vm of the current detection means Idc, and the difference is added to a connecting point B between the resistors R2 and R3 of the voltage control circuit.

With the above stated construction, for example, when the current of the above-stated converter is smaller than those of the other converters, the output voltage Vm of the maximum current detection circuit Cvm is larger than the output voltage Vj of the current detection circuit Cvj, and because the latter is subtracted from the former, the voltage of the connecting point B between the resistors R2 and R3 of the voltage control circuit is decreased.

As a result, the voltage of the connecting point A between the resistors R1 and R2 of the voltage control circuit is judged to become low, the voltage of the condenser C rises and the current value of the above-stated converter rises and approaches the current value of the other converters. In this manner, the magnitude of the output current is balanced.

Figure 5:
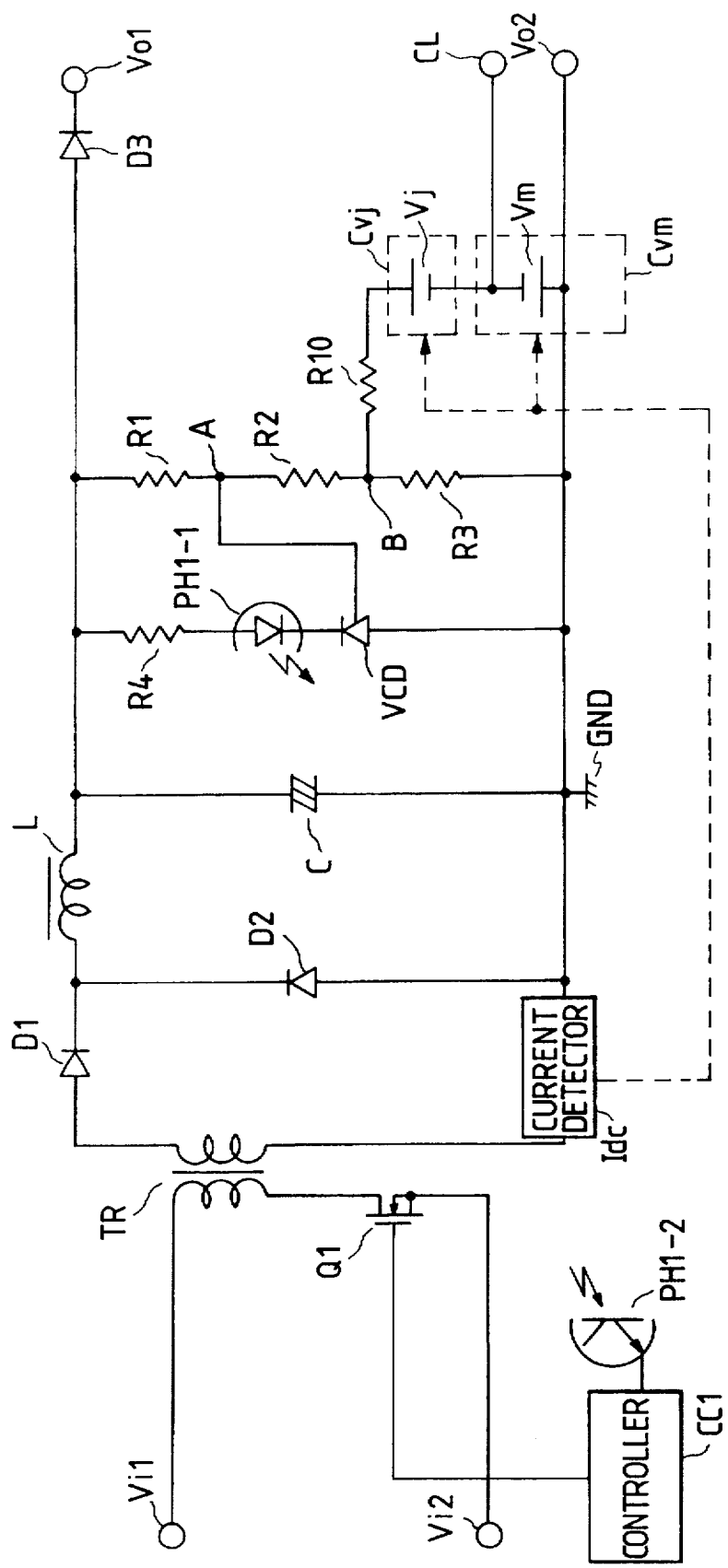
FIG. 5 is another circuit diagram showing a converter in FIG. 1.

FIG. 5 shows the balance circuit between the output Vj of the current detection circuit Cvj and the output Vm of the maximum current detection circuit Cvm.

A resistor R10 is provided between the negative polarity terminal Vo2 (the ground) of the converter and the connecting point B between the resistors R2 and R3. Through this resistor R10 the negative output Vm of the maximum current detection circuit Cvm is connected in series to an output Vj of the current detection circuit Cvj. Accordingly, a difference value is generated from the negative output Vm of the maximum current detection circuit Cvm and the output Vj of the current detection circuit Cvj.

Further, the control line CL is connected between the maximum current detection circuit Cvm and the respective current detection circuit Cvj. During parallel operation, through the control line CL the maximum current detection circuit Cvm operates to output a signal having a value equal to the larger of the values obtained from the other converters, on the one hand, and from the current detection means Idc of the converter on the other.

In the above stated construction, when this converter outputs the maximum current (that is, greater than the others), the negative output Vm of the maximum current detection circuit Cvm is equal to the output Vj of the respective current detection circuit Cvj. Since the voltage to be added to the connection point B between the resistors R2 and R3 is therefore zero, the current control does not affect the voltage control, and voltage fluctuation does not occur.

However, when one of the other converters outputs the maximum current (thus, greater than that of the converter considered herein), since the negative output Vm of the maximum current detection circuit Cvm is larger than the output Vj of the respective current detection circuit Cvj, the voltage to be added to the connection point B between the resistors R2 and R3 is negative. Thereby, the voltage control is affected by the current control, and the voltage of the condenser C is increased so that the current value of the converter rises and approaches the current value of the other converter. Thereby the current is balanced.

With the above stated arrangement, in the case of parallel operation of plural converters, even when a converter fails and the output becomes zero, the failed converter having the current value of zero does not affect the current control of the other converters.

Further, since the output of the converter has the diode D3, it is unnecessary to provide further apparatus which by preventing the reverse flow of the current and by detecting the failed converter, this fault converter can be cut off from the parallel operation arrangement through the switching means. As a result, a simply construction converter can be obtained.

Further, without the use of a high cost and complicated circuit (such as an operational amplifier etc.), a simple and compact circuit construction can be achieved using only a current transformer, a condenser and a diode.

By means of the above stated converters, since redundant parallel operation is performed by plural converters having a total capacity greater than that of the load, high reliability can be attained.

Figure 6:
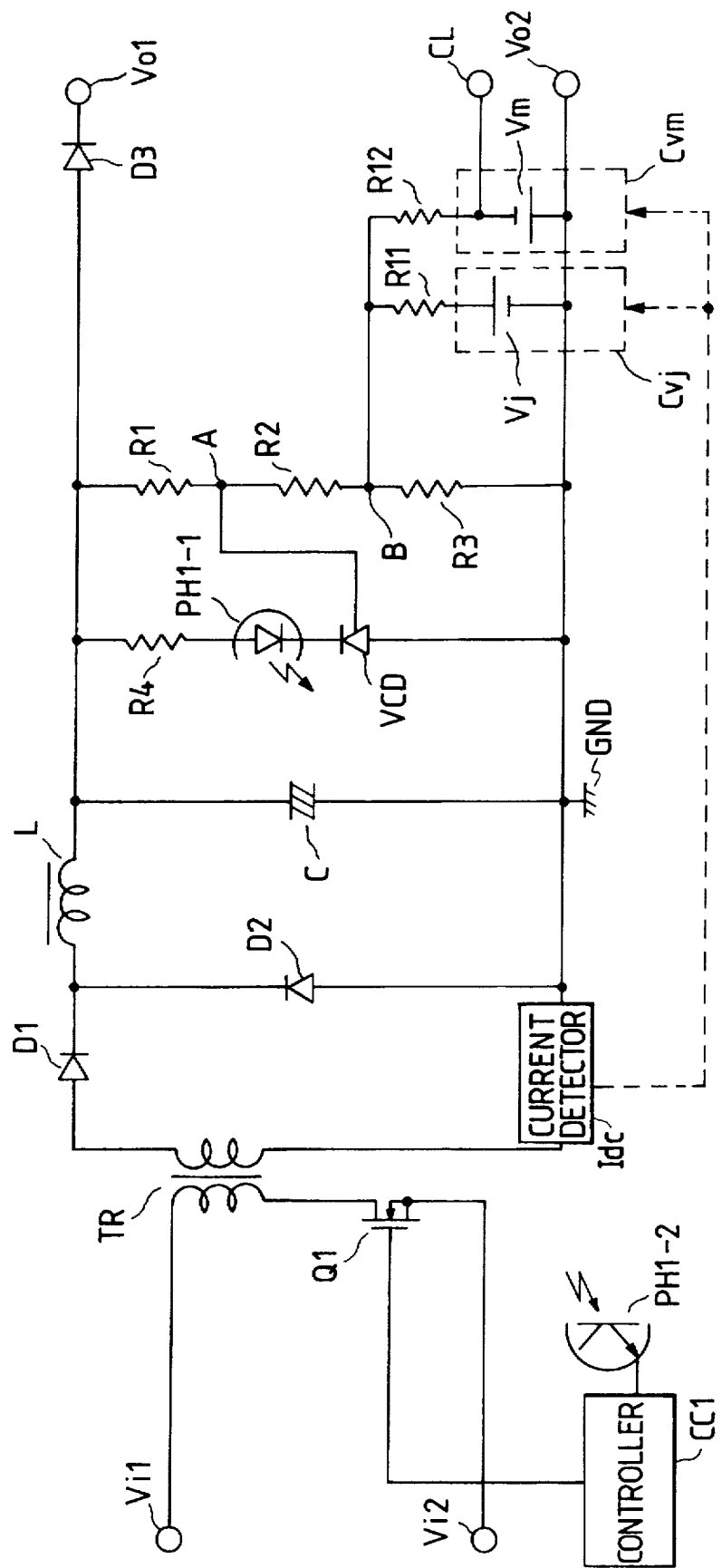
FIG. 6 is a further circuit diagram showing a converter in FIG. 1.

FIG. 6 is another embodiment showing a substraction circuit for the output Vj of the current detection circuit Cvj and the output Vm of the maximum current detection circuit Cvm.

Between the negative polarity terminal Vo2 (ground) of the converter and the connecting point B between the resistors R2 and R3, the negative output Vm of the maximum current detection circuit Cvm is connected through the resistor R12, in parallel with the output Vj of the current detection circuit Cvj, through the resistor R11. The negative output Vm of the maximum current detection circuit Cvm is thus summed with the output Vj of the current detection circuit Cvj.

Further, the control line CL is connected to the positive side of the maximum current detection circuit Cvm. During the parallel operation, the maximum current detection circuit Cvm operates to output a signal having a value equal to the larger of those obtained from the other converters (through the control line CL) and from the current detection means Idc of the respective converter.

With the above stated construction, when this converter outputs the maximum current (that is, a current greater than that of the other converters), since the negative output Vm of the maximum current detection circuit Cvm is equal to the output Vj of the current detection circuit Cvj, the voltage added to the connecting point B between the resistors R2 and R3 is zero. Accordingly, the voltage control is not affected by the current control, and voltage fluctuation does not occur.

However, when another converter outputs the maximum current (thus greater than that of the converter under consideration), since the negative output Vm of the maximum current detection circuit Cvm is larger than the output Vj of the current detection circuit Cvj, the voltage added to the connecting point B between the resistors R2 and R3 is negative. Accordingly, the voltage control is affected by the current control, which operates to increase the voltage of the condenser C.

Figure 7:
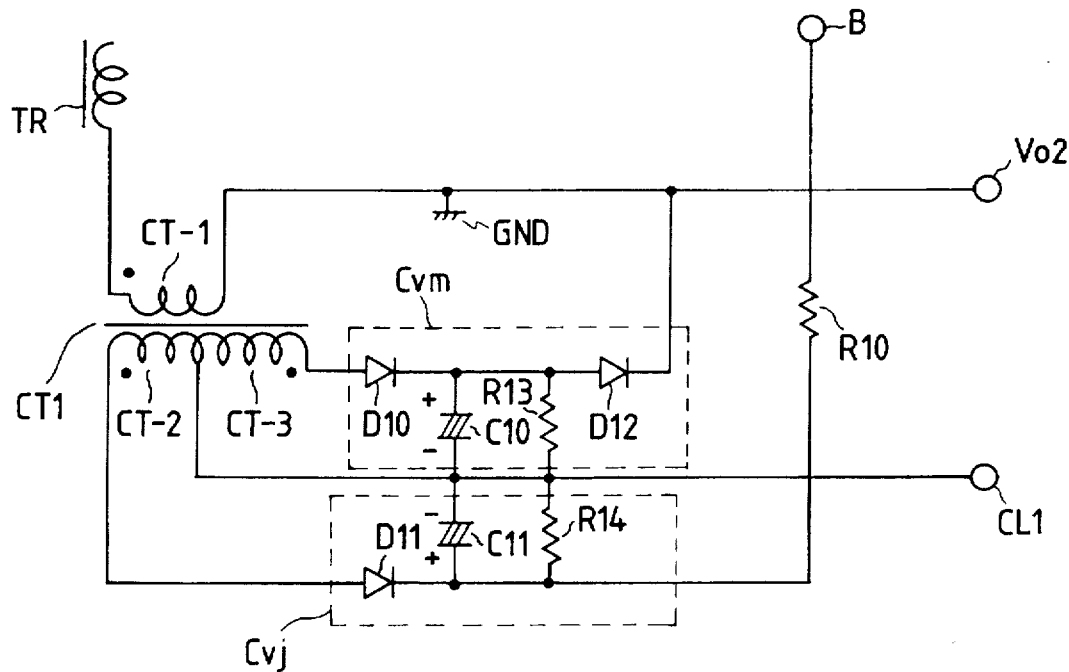
FIG. 7 is a circuit diagram showing a current control in FIG. 5.

FIG. 7 shows the arrangement of the current control for the converter shown in FIG. 5. A primary side CT-1 of the current transformer CT1, connected in series between the transformer TR and ground GND, is used as the current detection means Idc in FIG. 4. A condenser C11 and a resistor R14 are connected through a diode D11, to one of the secondary coils CT-2, and the positive pole of the condenser C11 is connected to the connecting point B through the resistor R10. This circuit, shown by a lower area surrounded by dot lines, is the current detection circuit Cvj shown in FIG. 5.

At another secondary coil CT-3 of the current transformer CT1, a condenser C10 and a resister R13 are connected through a diode D10, and the positive pole of the condenser C10 is connected to ground GND through a diode D12.

The negative pole of the condenser C10 is connected to the negative pole of the condenser C11 (one of the secondary CT-2 and CT-3 of the current transformer CT) and further connected to the control line CL. The circuit shown by the upper area surrounded by dot lines is the maximum current detection circuit Cvm shown in FIG. 5.

During parallel operation, the maximum current detection circuit Cvm outputs a signal having a value equal to that of the larger of the signals received from the other converters (through the control line CL), and from the current detection means Idc of the converter under consideration.

When the current of the transformer changes, a voltage proportional to this current is generated at the secondary coils CT-2 and CT-3 of the current transformer CT-1. By rectifying and smoothing each of those voltages through the current detection circuit Cvj on the one hand, and the maximum current detection circuit Cvm on the other, the negative output Vm of the maximum current detection circuit Cvm and the output Vj of the respective current detection circuit Cvj are summed, and the result is added to the ground GND of the voltage control and the connecting point B.

As explained in FIG. 5, when this converter outputs the maximum current (compared with the other converters), since the negative output Vm of the maximum current detection circuit Cvm is equal to the output Vj of the current detection circuit Cvj, the voltage added to the connecting point B between the resistors R2 and R3 is zero. Accordingly, the voltage control is not affected by the current control, and the voltage fluctuation does not occur.

However, when a converter other the one under consideration outputs the maximum current, since the negative output Vm of the maximum current detection circuit Cvm is larger than the output Vj of the current detection circuit Cvj, the voltage added to the connecting point B between the resistors R2 and R3 becomes negative. Accordingly, the voltage control is affected by the current control, and the voltage of the condenser C is increased. Therefore, the current value of this converter rises and approaches that of the other converter, so that the current is balanced.

Moreover, during plural parallel operation, even when a converter fails and its output becomes zero, the failed converter having the current value of zero does not affect the current control of the other converters.

Further, since the output of the converter has the diode D3, it is unnecessary to provide further apparatus which prevents a reverse flow of the current and detects the failed converter so that it can be cut off from the parallel operation arrangement through the switching means. As a result, a simple construction converter can be obtained.

Further, without the use of high cost and complicated circuitry (such as the operational amplifieretc.), a simple circuit can be achieved using only a current transformer, a condenser and a diode, and a compact circuit can be provided, especially by insulating using the current transformer.

By employing the above stated converters, since redundant parallel operation is performed by plural converters having a total capacity greater than that of the load, high reliability can be attained.

Figure 8:
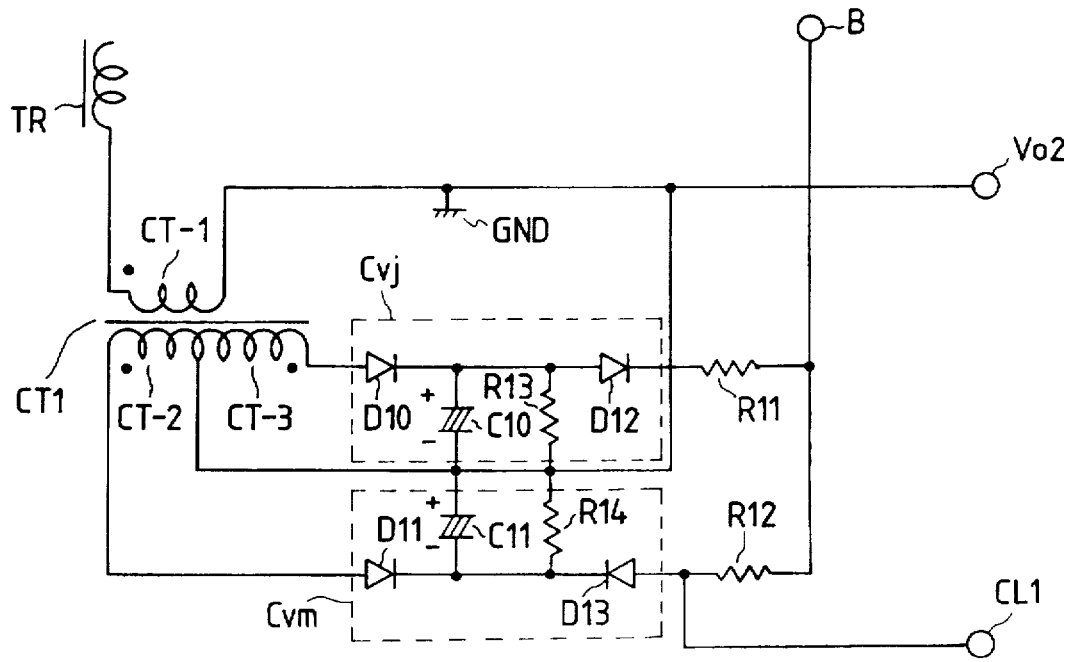
FIG. 8 is anther circuit diagram showing a current control in FIG. 6.

FIG. 8 is an example of an arrangement suitable for the current control shown in FIG. 6. The primary side CT-1 of the current transformer CT1 is connected in series between the secondary side of the transformer TR and the ground GND. The condenser C11 and the resistor R14 are connected through the diode D11 to one of the secondary coils CT-2 of the current transformer CT1, while the condenser C10 and the resistor R13 are connected to the other secondary coil CT-3. Furthermore, the negative pole of the condenser C11 is connected to the control line CL1 through the diode D13, and to the connecting point B shown in FIG. 6 through resistor R12, while the positive pole of the condenser C10 is connected to point B through diode D12 and resistor R11. The negative pole of the condenser C10 and the positive pole of the condenser C11 are connected to the grounded neutral tap of the secondary side of the transformer CT1.

It should be noted that in FIG. 8, the circuit shown by the lower area surrounded by dotted lines is the maximum current detection circuit Cvm shown in FIG. 6, while the upper area surrounded by dotted lines corresponds to the current detector Cvj in FIG. 6.

With the above stated construction, when the current of the transformer TR changes, a voltage proportional to this current is generated at the secondary coils CT-2 and CT-3 of the current transformer CT-1. By rectifying and smoothing each of those voltage through the current detection circuit Cvj and the maximum current detection circuit Cvm, the negative output Vm of the maximum current detection circuit Cvm and the output Vj of the respective current detection circuit Cvj are summed, and the result is added to the ground GND and the connecting point B of the voltage control.

As explained in FIG. 6, when this converter outputs the maximum current (compared to the other converters), since the negative output Vm of the maximum current detection circuit Cvm is equal to the output Vj of the respective current detection circuit Cvj, the voltage added to the connecting point B between the resistors R2 and R3 is zero. Accordingly, the voltage control is not affected by the current control, and voltage fluctuation does not occur.

However, when another one of the parallel converters outputs the maximum current, since the negative output Vm of the maximum current detection circuit Cvm is larger than the output Vj of the current detection circuit Cvj, the voltage added to the connecting point B between the resistors R2 and R3 becomes negative. Accordingly, the voltage control is affected by the current control, and the voltage of the condenser C is increased. Therefore, the current of this converter rises and approaches that of the other converter, so that the current is balanced.

Figure 9:
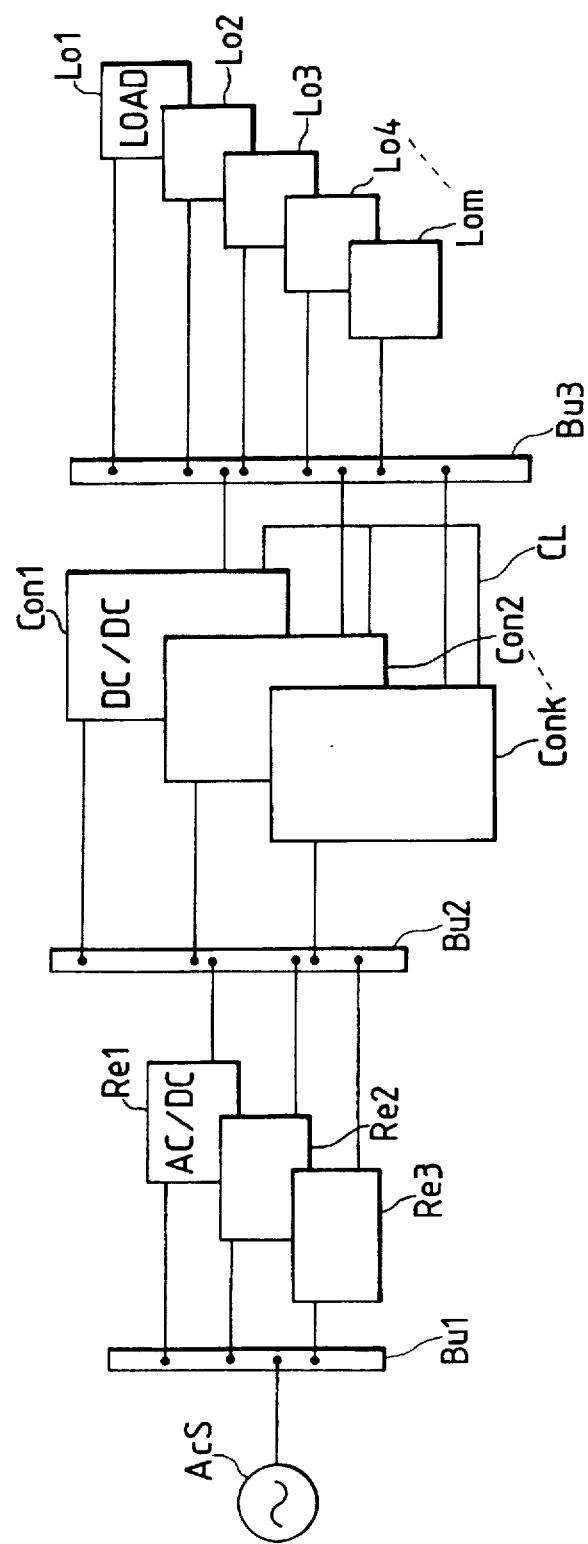
FIG. 9 is a block diagram showing another embodiment of a power supply system according to the present invention.

FIG. 9 is a block diagram showing a power supply system of another embodiment according to the present invention. The differences in the construction shown in FIG. 9 compared with the above described construction shown in FIG. 1 are that the AC/DC converter ADcon shown in FIG. 1 is replaced by the plural rectifying circuits Re1–Re3, with the input and output terminals of each of the respective rectifying circuits Re1–Re3 being connected to common buses Bu1 and Bu2. An alternative current power supply AcS is connected to the common bus Bu1.

Further, the inputs of the plural DC/DC converters Con1–Conk are connected to the common bus Bu2, and the outputs of the DC/DC converters Con1–Conk and the plural loads Lo1–Lom are connected to a common bus Bu3.

In the embodiment of FIG. 9, by providing separate rectifying circuits Re1–Re3 to constitute the power supply system, with their respective outputs connected to the common buses Bu1, Bu2 and Bu3, redundancy in the power supply system of this embodiment according to the present invention can be further improved.

Further, in the construction of the power supply system shown in FIG. 9, when the capacity and number of loads connected to the common bus Bu3 are expressed respectively as Wf and m, and the capacity and number of converters are expressed respectively as Wp and k, so that all loads are partially charged by the converters, the system can be designed so that Wp×k>Wf×m. That is, the total capacity of the converters is greater than the total capacity of the loads.

Herein, even when one converter fails (the number of failed converters h=1), the system can still operate to supply the load so long as Wp×(k−1) a Wf×m. Further, in case that the number of failed converters h is 2, continued operation can be achieved so long as Wp×(k−2)≧Wf×m.

When the capacity and number of the rectifying circuits connected to the common bus Bu2 are expressed respectively as Wr, and similarly to the above the relationship between the rectifying circuits and the converters, an allowance failure number h equal to 1 can be attained by selecting Wr×(a−1)≧Wp×k.

Similarly too, in the relationship between three elements (the loads, the converters and the rectifying circuits), when the allowance failure number h of the converter and the rectifying unit is 1, continued operation can be attained by the selection to consist a formula Wr×(a−1)≧Wp×(k−1) ≧Wf×m.

Figure 10:
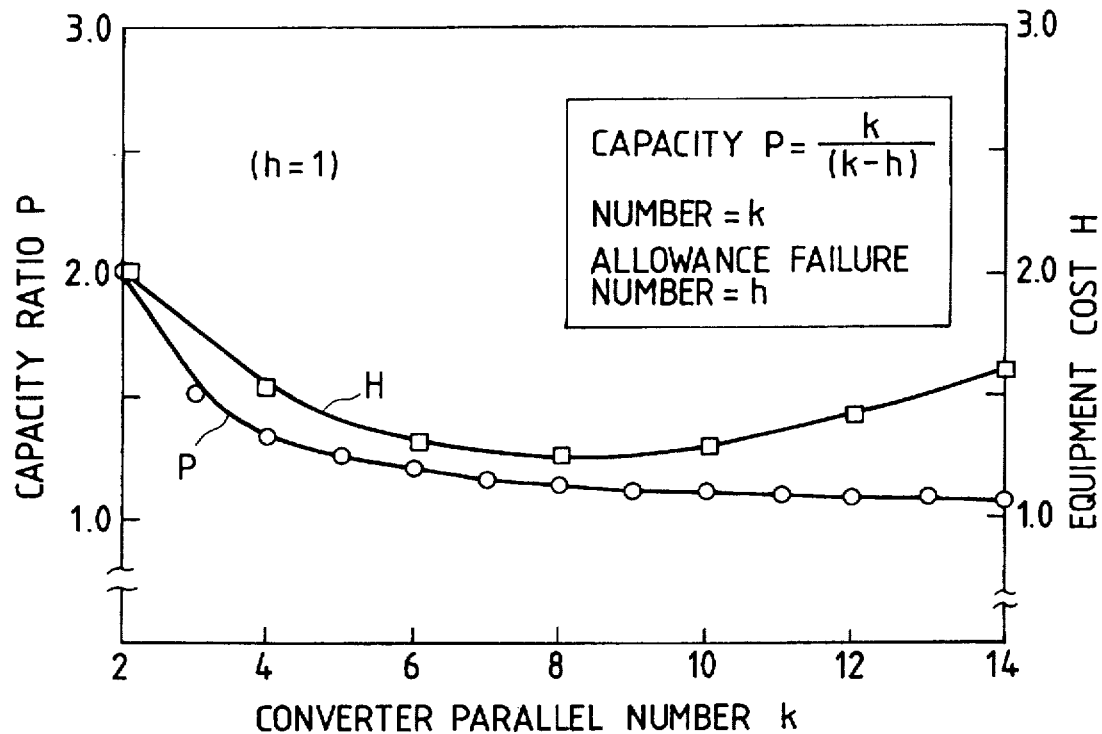
FIG. 10 is a graphic illustration of one example of the relationship between the parallel number and a capacity ratio of a converter.

FIG. 10 shows the relationship between the number k of parallel converters and a capacity ratio P (the ratio of the total capacity (Wp×k) of all of the parallel converters to the total capacity of all loads (Wf×m)), in case of the allowance failure number h=1.

When the parallel number k (that is, the number of parallel converters) is 2, the capacity ratio P becomes two times all loads; when the parallel number k becomes large, it can be dispensed with the small capacity ratio P. Further, since equipment cost H of the converter is proportional to the ratio P as well as to the number of the converters, a curve shown in the figure can be obtained. Judging from this figure, the most economic parallel number k is 4–10.

Figure 11:
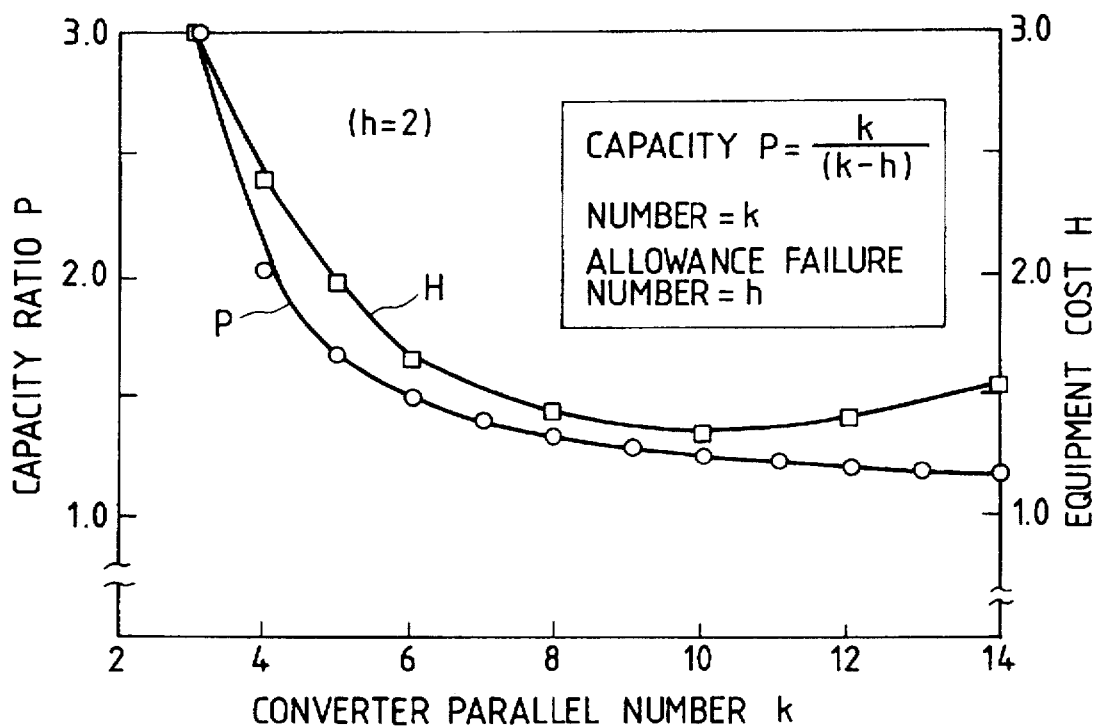
FIG. 11 is a graphic illustration of another example of the relationship between the parallel number and a capacity ratio of a converter.

FIG. 11 shows a relationship similar to that of FIG. 10, in a case of the allowance failure number h=2. As can be seen from FIG. 11, the most economic parallel number k is 6–12.

Judging from the above facts, when the allowance failure number is h, it is included within a range of a formula (2+2h)≦k≦(8+2h). When the parallel number of the converters is selected as stated above, the redundancy having a high reliability in the power supply system can be assembled with a low cost and a small equipment capacity.

Figure 12:
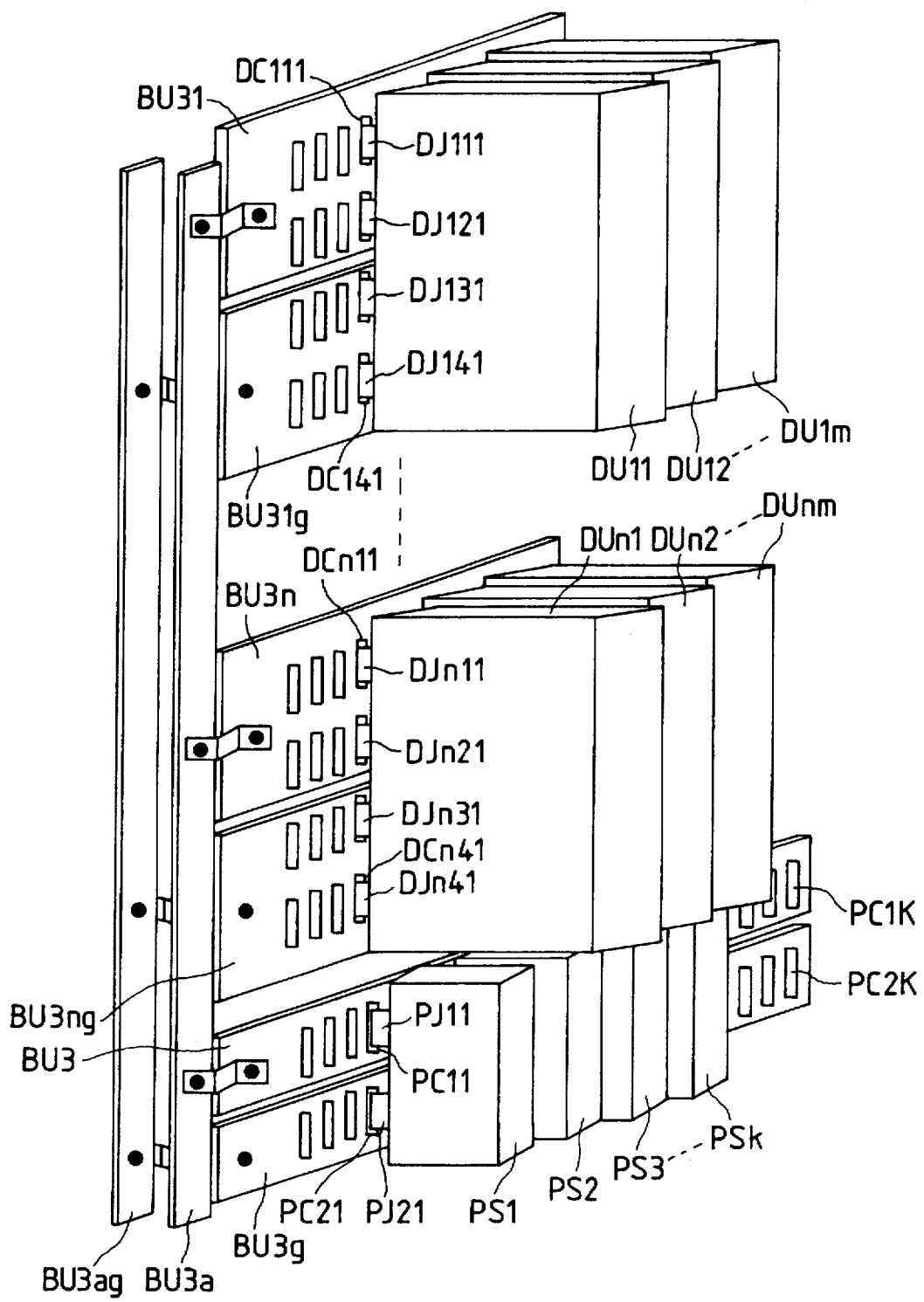
FIG. 12 is a perspective view showing an embodiment of the present invention in which a power supply system is installed into a magnetic disk apparatus.

FIG. 12 is a view showing a construction in which a power supply system is assembled in a magnetic disk apparatus of another embodiment according to the present invention. This embodiment comprises the common bus Bu3, the magnetic disk apparatus and the AC/DC converter.

The power supply units PS1–PSk are constituted by the AC/DC converter. So as to directly connect outputs of the AC/DC converter to a plus side common bus BU3 and a minus side common bus BU3g, a common bus side of the AC/DC converter is constituted with sockets PC11–PC21 and a power supply unit side of the AC/DC converter is constituted with plugs PJ11–PJ21.

The plus side common bus BU3 is connected to common buses BU31p–BU3np through a further common bus BU3g. Similarly to, the minus side common bus BU3g is connected to common buses BU3g–BU3ng through a further common bus BU3ag.

The magnetic disks DU11–DU1m are connected to the common buses BU3 and BU3g through the sockets DC11–DC14 and the plugs DJ111–DJ141. The magnetic disks DUn1–DUnm are connected to the common buses BU3n and BU3ng through the sockets DCn1–DCn4 and the plugs DJn11–DJn41.

Since two sockets and two plugs of the magnetic disk are disposed in the power supply system, the connection is performed surely and the fixing is performed easily, thereby the possibility of failure in connection can be diminished.

By dividing the common buses of the load side into the common buses BU31–BU3n, even when the trouble occurs at the load side, only the affected common bus becomes inoperative, and the other common buses can operate safely. Further, with such an arrangement of the common buses, the sockets and the plugs, it is easy to insert and remove the power supply unit and the magnetic disk; furthermore the extensions of the power supply unit and the magnetic disk can be performed easily.

Figure 13:
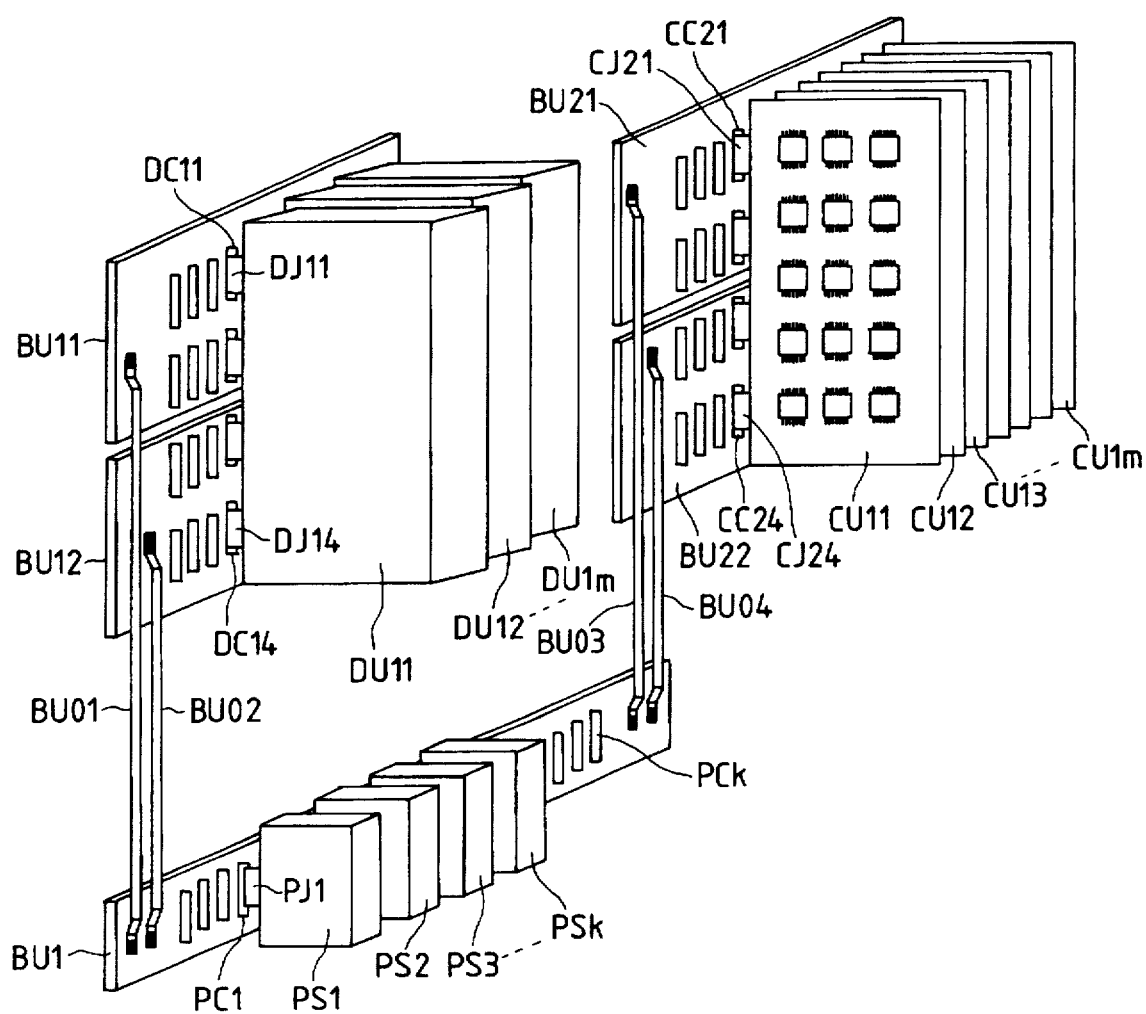
FIG. 13 is a perspective view showing an embodiment in which includes a control circuit for a magnetic disk apparatus in addition to a magnetic disk and converters shown in FIG. 7.

FIG. 13 shows an arrangement of the magnetic disks, the converters and the control circuits for the magnetic disks. In this figure, the negative pole of the common bus is omitted.

So as to directly connect the outputs of the power supply units PS1-PSk constituted by the converters to the common bus BU1, a common bus side of the power supply units PS1-PSk has sockets PC1-PCk and a Power supply unit side of the power supply units PS1-PSk has plugs PJ1-PJk. The common bus BU1 is connected to the common buses BU11-BU12 and the common buses BU21-BU22 through next common buses BU01-BU04.

Further, the magnetic disks DU11-DU1m are connected to the common buses BU11 and BU12 through the sockets DC11-DC14 . . . and the plugs DJ111-DJ141 . . . . The control circuits CU11-CU1m are connected to the common buses BU21 and BU22 through the sockets CC21-CC24 . . . and the plugs CP11-CP41 . . . .

Since two sockets and two plugs of the magnetic disk and the control circuit are disposed respectively in the power supply system, the connection is performed surely and repair is performed easily. Thereby, the contact failure in connection can be lessened.

By dividing the common buses of the load side into the common buses BU11 and BU12 and the common buses BU21 and BU22, even when the trouble occurs on one common bus, since the other common buses can operate safely, the power supply system does not fail.

Further, with such an arrangement of the common buses, the sockets and the plugs, it is easy to insert and remove the power supply unit and the magnetic disk; also the extensions of the power supply unit and the magnetic disk can be performed easily.

Figure 14:
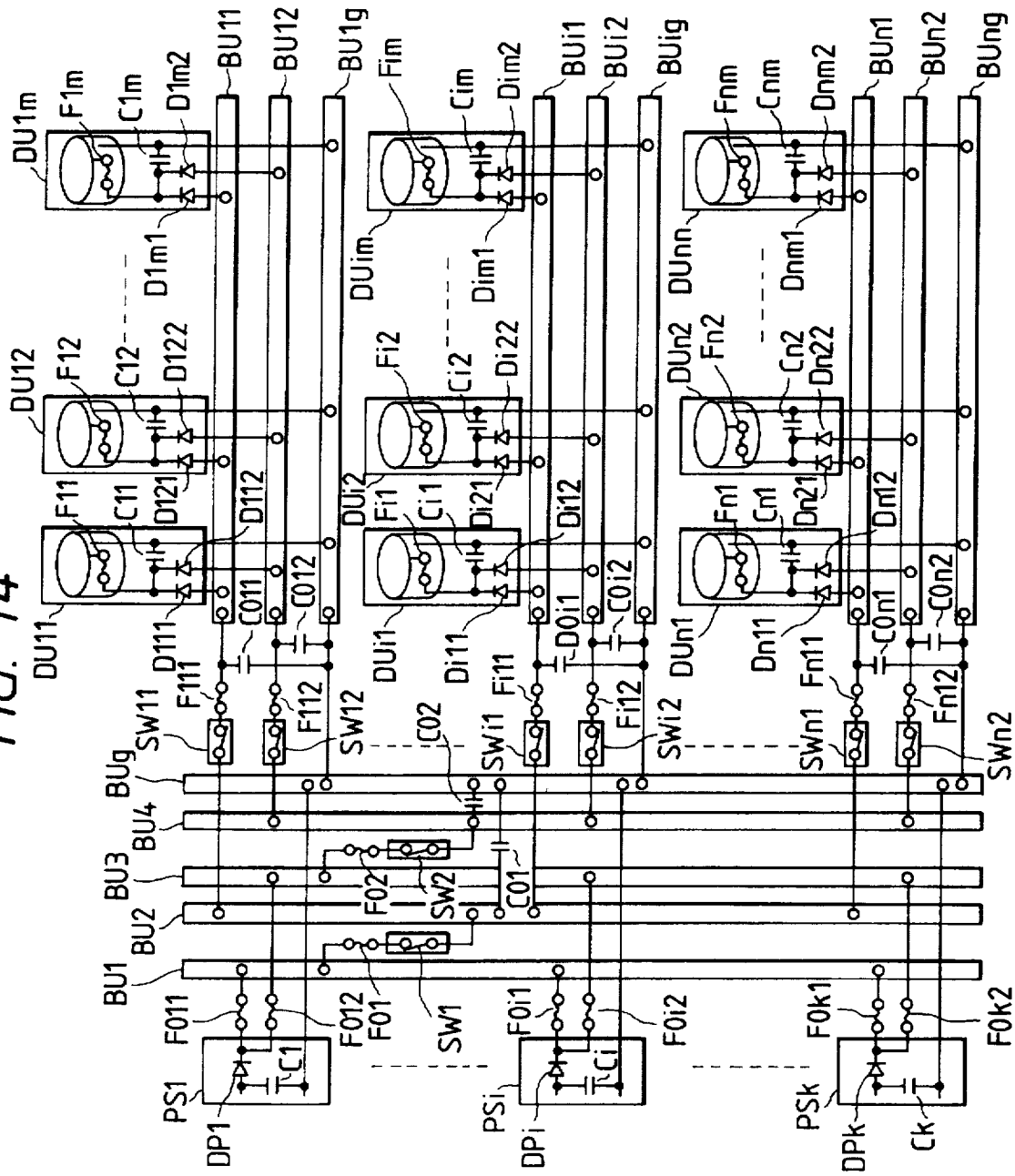
FIG. 14 is a schematic illustration showing a connection example by a common bus comprising plural converters and plural magnetic disk apparatuses according to the present invention.

FIG. 14 is an example showing the connection of the plural converters, the plural magnetic disks being the loads, and the common buses. In this example, multiple common buses are arranged in a matrix; and by dividing the magnetic disks the common buses to be connected to the magnetic disks are classified.

First of all, the magnetic disks (the loads) are divided into plural groups comprised of a group of DU11-DU1m, . . . , a group of DUi1-DUim, . . . , and a group of DUn1-DUnm. The magnetic disks of each group are connected to the plural common buses composed of a group of BU11-BU1g, . . . , a group of BUi1-BUig, . . . , and a group of BUn1-BUng, which are arranged as shown in figure.

The magnetic disks DU11-DU1m are connected to the common bus BU11 through diodes D111-D1m1 and further connected to the common bus BU12 through diodes D112-D1m2. Further, each of the negative poles of the magnetic disks DU11-DU1m is connected to the common bus BU1g and can receive to the supply of the electric power.

The magnetic disks DUi1-DUim, . . . , and DUn1-DUng of the other groups are connected similarly to the first common buses BUi1-BUig, . . . , and BUn1-BUnm. These positive pole common buses are connected to a second common buses BU2 and BU4 through fuses F11-F12, ... , Fi1-Fi2, . . . , and Fn1-Fn2 and switches SW11-SW12, . . . , SWi1-SWi2, . . . , and SWn1-SWn2.

Each of the negative poles of the first common buses BU1g, . . . , BUig, . . . , and BUng is connected to the negative pole of each converter PS1, . . . , PS2, . . . , and PSk and further is directly connected to the second common bus BU5. Further, the second common buses BU2 and BU4 are connected to the common buses BU1 and BU3 through the switches SW1 and SW2 and the fuses F1 and F2, respectively.

Each of the common buses BU1 and BU3 is connected respectively to each of the converters PS1, . . . , PS2, . . . , and PSk through the fuses F011, . . . , F012, . . . , and F0k1 and F021, . . . , F022, . . . , and F0k2.

Each of the outputs of the converters is connected respectively to the diodes DP1, . . . , DPi, . . . , and DPk, preventing a reverse current flow. Further, between the positive pole and the negative pole of each of the first common buses, the condensers C011, C012, . . . , C0i1, C0i2, . . . , and C0n1, C0n2 are connected, similarly to each of the second common buses is connected to the condensers C01, C02.

As stated in above, the common buses are arranged in a matrix, so that, for example, in case that a short-circuit occurs in the first common bus BU11, the fuse F11 blows, and this common bus BU11 is cut off. However, the other first common bus BU12 continues to supply electric power to the group of the magnetic disks DU11-DU1m so that the system can continue to operate, and further high reliability in the system can be secured.

Further, since the common buses are classified, repair of a short-circuit in the first common bus BU11, for example, can be carried out by opening the switch SW11. When the repair has been completed, the fuse F11 is exchanged, and the switch SW11 is closed again. Accordingly, maintenance in the system can be performed easily.

When the first common bus BU11 is under repair, in the other magnetic disk group the current is supplied from the double system common bus, thereby even when one system of the common buses fails, the system does not fail. Since the other first common bus is constituted similarly to the above construction, high reliability in the system can be attained.

Further, since the second common bus is constituted also with double system construction, failure of one common bus does not cause a system failure. The condenser inserted in each common bus stabilizes the voltage. Also in a case of the short-circuit of the common bus the fuse melting is carried out easily, and the effect to the other common buses is decreased.

Further, fluctuation in voltage due to the insertion or withdrawal of a magnetic disk in a live state can be prevented.

When magnetic disk is used as the memory of the computer, since the length of the data for dealing is constituted by multiples of 8 bits, accordingly it is convenient to constitute the group of the magnetic disk for connecting a pair of the common buses with the multiple of 8 bits.

Further, with respect to the line of the data for recording, since the magnetic disk is also constituted by a multiple of 8 bits, the number of the first common bus is constituted by a multiple of 8 bits and the line of the recording data is made to have a different common bus direction.

For example, with the magnetic disks DU11, . . . , DUi1, . . . , and DUn1 arranged as the data line, even when the common buses BU11 and BU12 of one group fail completely, the data of 1 failed bit can be reproduced according to the parity and 7 bits.

Further, when in a case of an increase of the magnetic disk, 1, . . . , i, . . . , and n being the line of the data are made as one set, the magnetic disk is increased toward the direction of 1, . . . , and m, and in response to the increase number of this magnetic disk the number of the converter PS is increased. Accordingly, and a superior construction having the high reliability and the high efficiency in the system can be obtained.

Figure 15:
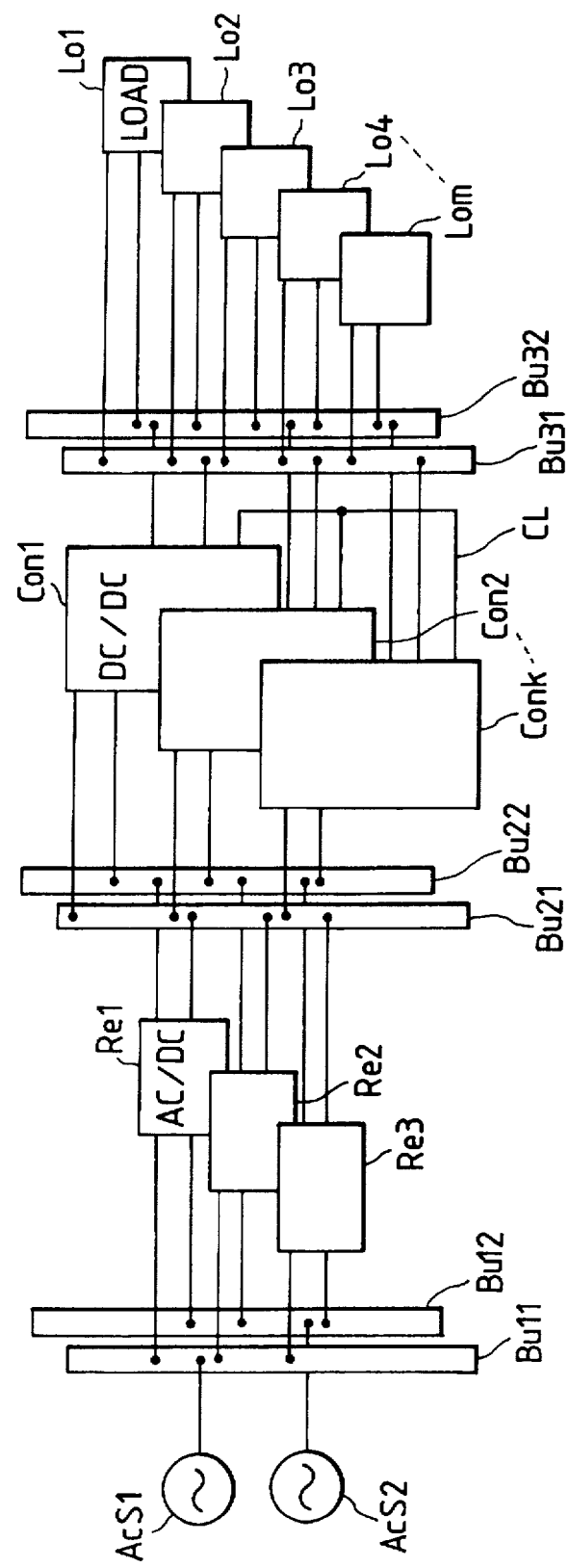
FIG. 15 is a block diagram showing a further embodiment of a power supply system according to the present invention.

FIG. 15 is a view showing an embodiment of the invention having plural common buses. In this figure, the common buses are formed with the multiple construction in which two of the common buses Bu1, Bu2, Bu3 are used respectively.

In the construction shown in this figure, the ground sides of the common buses are omitted. However, since the common buses are formed with the multiple construction, a failure of one common bus, such as a wire-break, does not stop the system. Accordingly, it is possible to improve the reliability in the system.

The common bus Bu11 is connected to the alternating current power supply AcS1 and each of the inputs of the rectifying units Re1–Re3. The common bus Bu12 is connected to the AC power supply AcS2 and each of the inputs of the rectifying units Re1–Re3. With this construction, even if one AC power supply fails, the system does not fail.

Similarly, the common buses Bu21 and Bu22 are connected to the outputs of the plural rectifying units Re1–Re3 and the inputs of the plural converters Con1–Cconk. The common buses Bu31 and Bu32 are connected to the outputs of the plural DC/DC converters Con1–Cconk and the plural loads Lo1–Lom.

With the above construction, in the common buses Bu31 and Bu32, the capacity and the number of each load are expressed respectively as WL and m, the capacity and the number of the converter are expressed respectively as Wc and k. In this case, the system having the high reliability against the failure can be obtained.

Namely, when the allowance failure number h for continuing the operation is 1, each of the load and converter units is selected to satisfy a formula Wc×(k−1)≧WL×m, and when the allowance failure number h is 2, each of the load and the converter units is selected to satisfy a formula Wc×(k−2)≧WL×m.

In other words, if one or two rectifying units Re1–Re3 or converters fails, the system does not fail. Also, if one of the common buses fails (such as a wire-break) the system does not fail. Accordingly, the system having high reliability can be constructed.

Figure 16:
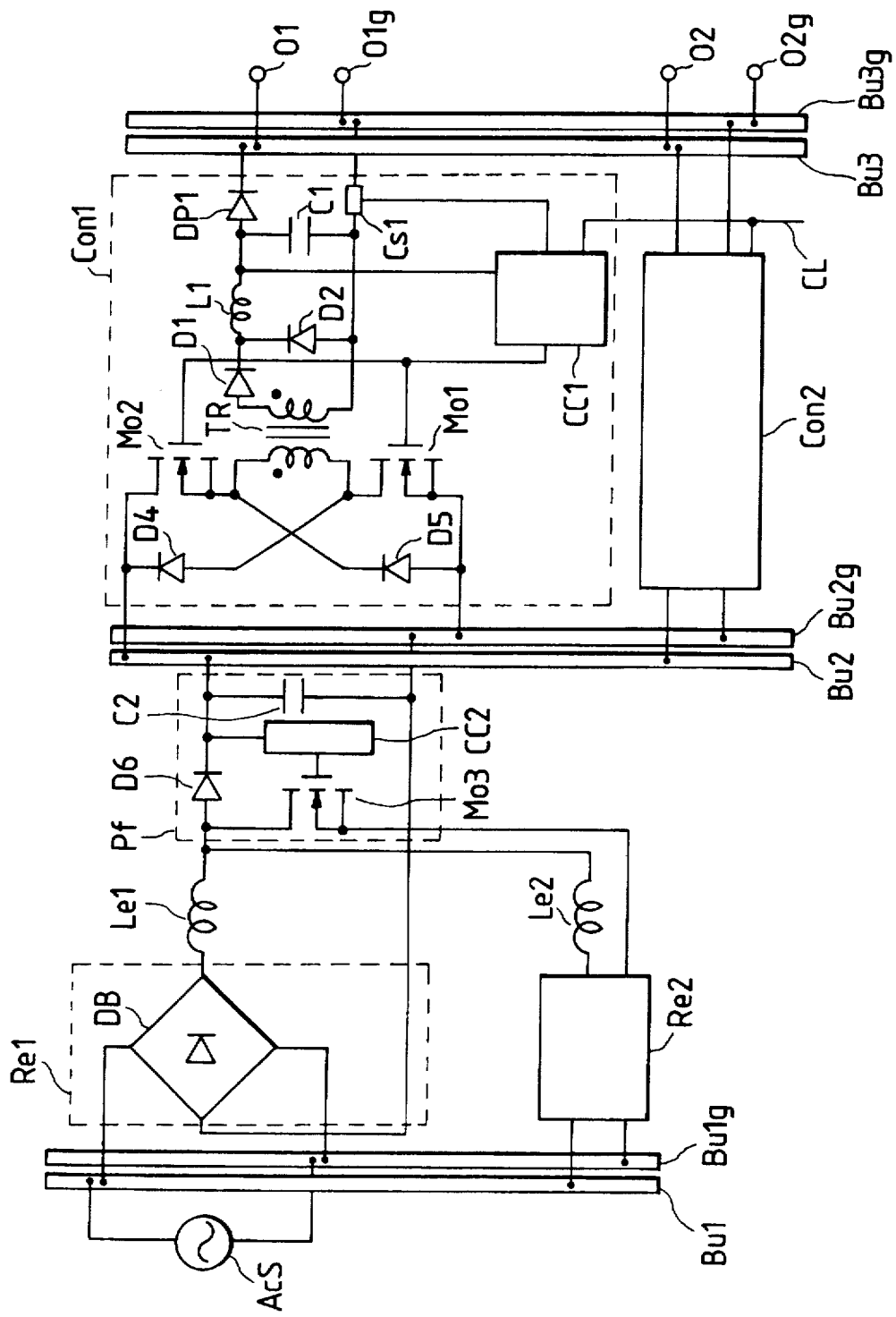
FIG. 16 is a circuit diagram showing a further embodiment of a power supply system including a power factor improvement circuit according to the present invention.

FIG. 16 shows a power supply system of another embodiment according to the present invention, which includes a power factor improvement circuit.

The outputs of the rectifying units Re1 and Re2 (constituted by a diode bridge DB) are connected to a power factor improvement circuit Pf through the inductances Le1 and Le2. By this construction, only one power-factor improvement circuit is utilized, so that a compact and a low cost power supply system is manufactured.

Further, in this figure, using the plus side common buses Bu1, Bu2 and Bu3 and the minus side common buses Bu1g, Bu2g and Bu3g, the common buses Bu2 and Bu2g are connected to the alternative current supply AcS and the inputs of the plural rectifying units Re1–Re2.

The common buses Bu2, Bu2g are connected to the outputs of the plural rectifying units Re1–Re2 through the power factor improvement circuit Pf and further are connected to the inputs of the plural DC/DC converters Con1–Con2. The common buses Bu3 and Bu3g are connected to the outputs of the DC/Dc converters Con1–Con2. Accordingly, plural outputs 01, 02 are supplied to the load.

Herein, the construction and the operation of the above stated power-factor improvement circuit Pf will be explained. A semiconductor switch Mo3 is constituted to make the short-circuit to the output of the rectifying unit Re1 through the inductance Le1 and further is connected to a condenser C2 through a diode D6. The semiconductor switch Mo3 is controlled to form the condenser C2 having a predetermined terminal voltage Vc2.

With the above operation, the ratio of the on/off (duty) of switch Mo3 is controlled in proportion to the difference in voltage between the output voltage Vdb of the full-wave rectification diode bridge and the terminal voltage Vc2 of the condenser C2. When the terminal voltage Vc2 of the condenser C2 is lower than the output voltage Vdb of the full-wave rectification diode bridge, the duty ratio becomes large, and the large energy accumulated in the inductance lE1 causes a current to flow to the condenser C2. On the other hand, when the terminal voltage Vc2 of the condenser C2 becomes larger than the output voltage Vdb of the full-wave rectification diode bridge, the duty ratio becomes small, and the small energy accumulated in the inductance Le1 prevents the current charged in the condenser C2 from enlarging excessively. Thus, an output current having a substantially sinusoidal waveform is achieved (as opposed to a spiked waveform generated by the prior art), and a power factor of approximately 1.0 can be achieved at the alternating current output.

The voltage of the condenser C2 is input to the DC/DC converter Con1 shown in this figure, through the common bus Bu2. This DC/DC converter Con1 is a double forward type converter having two MOS transistors Mo1 and Mo2 and the transformer TR connected in series at the primary side thereof. Further, the diodes D4 and D5 are connected by crossing each of the transistors M01 and M02 and the transformer TR as shown in figure. The secondary side of the DC/DC converter Con1 is constituted by the diodes D1 and D2, the inductance L1 and the condenser C1.

Herein, according to the control circuit CC1 the duty ratio of the transistors Mo1 and Mo2 is controlled by feeding back the voltage of the condenser C1 and the load current detected through the current sensor Cs1. The diode DP1 prevents a reverse current from other converters during parallel operation of the converter Con2. The control line CL is a control signal for parallel operation of the converter, and this signal indicates a standard signal for the current control.

Figure 17:
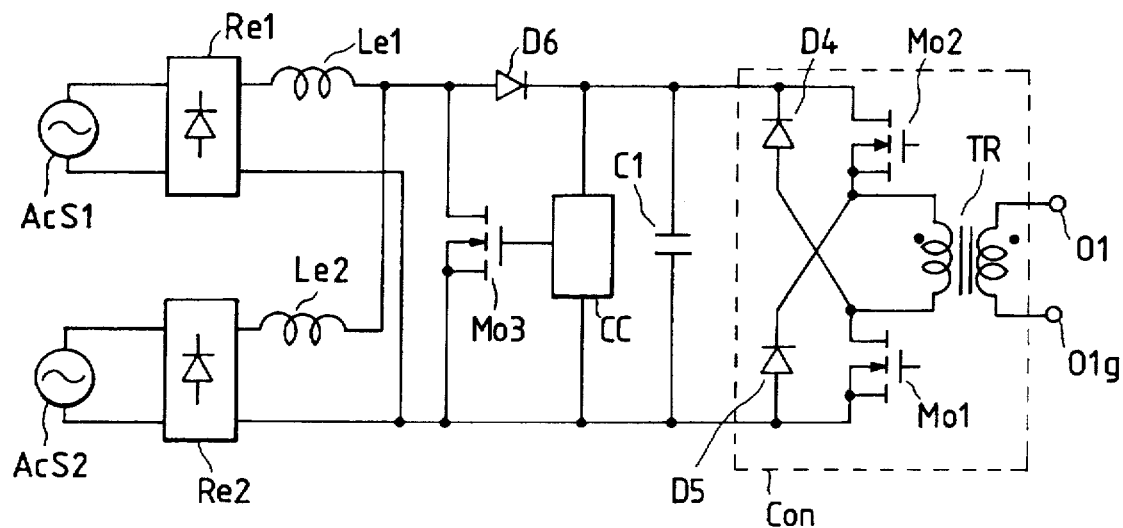
FIG. 17 is a circuit diagram showing a further embodiment of a power supply system including a power factor improvement circuit according to the present invention.

FIG. 17 shows a further embodiment of a power supply system according to the present invention. The portion different from the construction shown in FIG. 16 is that two alternative current inputs are processed according to one power factor improvement circuit.

Each of the alternative current supplies AcS1 and AcS2 ia connected to MOS transistor Mo3 during the "on" condition through the rectifying units Re1 and Re2 and the inductance Le1. Further during the "off" condition of the MOS transistor Mo3, the energy accumulated in the inductances Le1 and Le2 is connected to charge the condenser C1 through a diode D6.

In the power factor improvement operation similarly to the above, the duty ratio of the MOS transistor Mo3 is controlled to maintain the voltage of the condenser C1 at a constant level according to the control circuit CC. When the voltage of the condenser C1 becomes higher, the duty ratio decreases, so that any increase in the current for flowing into the condenser C1 is suppressed.

In this way, when the voltage in the rectifying unit is high, the current is suppressed, and when the voltage in the rectifying portion is low, the current flows. Accordingly, the pulse-like current flow from the alternating current supply is suppressed and approximates a sine wave as same to the voltage. Thereby, a high power factor having a small higher frequency in the system can be obtained.

Further, since this function operates similarly for the both inductances Le1 and Le2, with respect to the respective alternating current supply, the input current is can be made to approximate a sine wave. Also, only one power factor improvement circuit is needed, so that a compact power supply system can be obtained.

Figure 18:
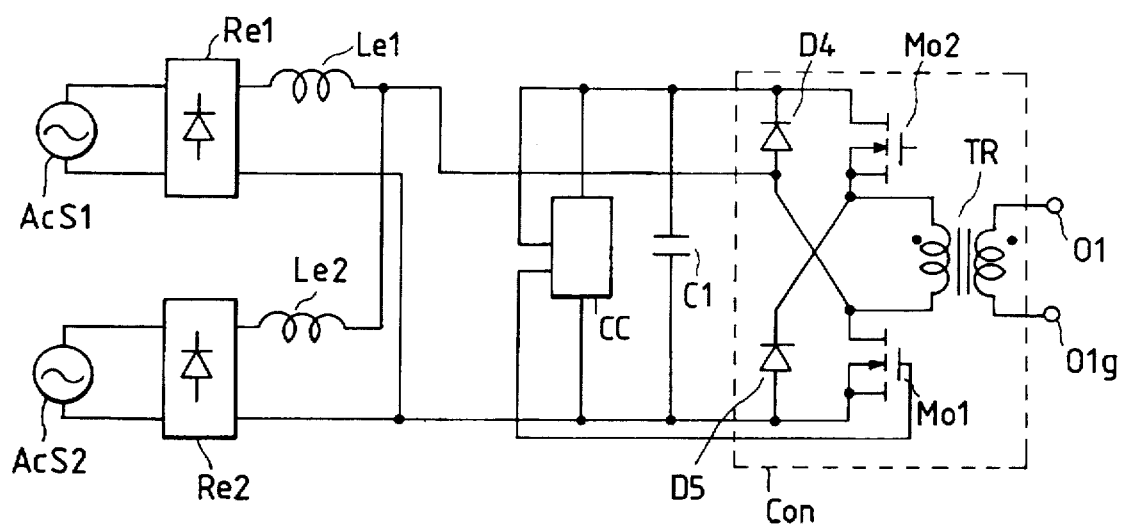
FIG. 18 is a circuit diagram showing a further embodiment of a power supply system including a power factor improvement circuit according to the present invention.

FIG. 18 shows a further embodiment of a power supply system according to the present invention. The portion different from the construction shown in FIG. 17 is that the power factor improvement is omitted, and two switching elements are used in the double forward type converter, so that the power-factor improvement can be attained.

The DC/DC converter Con is the double forward type converter as shown in figure. Two MOS transistors Mo1 and Mo2 are connected to the transformer TR in series, and the diodes D4 and D5 are connected to cross with each of the transistors Mo1 and Mo2 and the transformer TR as shown in figure.

The outputs of the alternating current supplies AcS1 and AcS2 are connected to the switching element Mo1 through the rectifying units Re1 and Re2 and the inductances Le1 and Le2. Further, the control circuit CC for controlling the switching element Mo1, not shown in figure, controls the output voltage of the converter and the voltage of the condenser C1 at constant. In this construction, the switching element Mo1 and the diode D4 operate to serve both the operation for the converter and the operation for the power factor improvement.

In this circuit, when the switching elements Mo1 and Mo2 are controlled under a certain condition, both the converter operation and the power factor improvement can be attained at the same time. The above condition is that the control of the converter is performed by the switching elements Mo1 and Mo2 and the power factor improvement is performed by the switching element Mo1.

The power factor improvement operation is performed by increasing the "on" period of the switching element Mo1 relative to the "on" period of the switching element Mo2. According to the difference in the "on" period, energy is accumulated in the inductances Le1 and Le2. During the "off" period of the switching element Mo1 the stored energy is accumulated in the condenser C1 through the diode D4.

So as to carry out the above, the control circuit CC controls the difference between the "on" periods in the switching elements Mo1 and Mo2 so as to maintain the voltage of the condenser C1 at constant. When the voltage of the condenser C1 becomes high, the difference in the "on" periods is made small; thereby any increase in the current flowing into the condenser C1 is suppressed.

By the above stated operation, when the voltage of the rectifying unit is high, the current is suppressed, and when the voltage of the rectifying unit is low, the current is allowed to flow.

Accordingly, the pulse-like current flow from the alternating current supply is suppressed and approximates a sine wave following the voltage; thereby the high power factor having a small high frequency in the system can be obtained. Further, since this function is operated similarly to for both inductances Le1 and Le2, with respect to the alternating current supply the input current can be made to approximate a sine wave.

Figure 19:
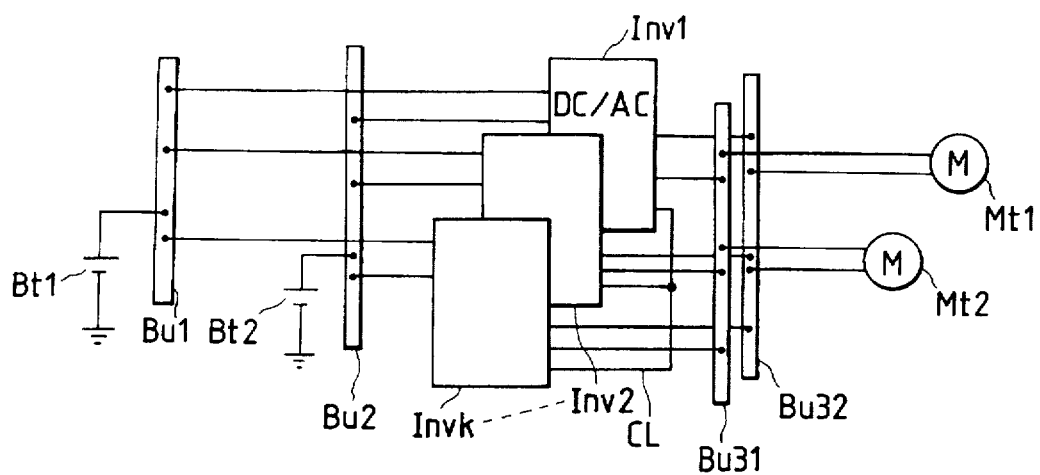
FIG. 19 is a block diagram showing an example in which a power supply system according to the present invention is adapted to an automobile.

FIG. 19 shows an application of the power supply system according to the present invention to a motor for driving an electric car Ca1. In the electric car Ca1, the electric power is supplied by a battery connected to a DC/AC inverter which generates an alternating current output to drive the motor.

In this example, so as to improve the reliability in the apparatus, a common bus is connected between plural batteries Bt1 and Bt2 and plural inverters In1–Ink. Thereby, when one of the batteries becomes down, the electric power is supplied from another battery, so that the system does not fail. Further, the common buses Bu31 and Bu32 are connected between the plural inverters In1–Ink and the plural motors Mt1 and Mt2.

With the above construction, in the common buses Bu31 and Bu32, the capacity and number of the loads are expressed respectively as Wm and m, the capacity and number of the inverters are expressed respectively as Wc and k. So as to partially charge all loads by all inverters, the following formula must be satisfied:

$$Wp \times k \geq Wm \times m.$$

However, to provide for the case where one inverter fails, when the allowance failure number h for continuing the operation of the system is 1, the formula $Wp \times (k-1) \geq Wf \times m$ must be satisfied. Further, when the allowance failure number h is 2, the formula $Wp \times (k-2) \geq Wf \times m$ must be satisfied.

Further, in the common bus Bu2, the capacity and number of batteries are expressed respectively by Wb and a, similarly to the relationship between the battery and the inverter, when the allowance failure number h is 1, it can be attained by selection so as to satisfy a formula $Wb \times (a-11) \geq Wf \times m$.

By the above selections, even when one inverter fails, since the motor is supplied with electric power from another inverter, the system does not fail, and can operate normally. Accordingly, a system having high reliability can be obtained.

Herein, since the ground side of the common bus is omitted, by using a matrix construction for the common buses Bu31 and Bu32, even when a failure such as a wire-break occurs in one common bus, the system does not stop; accordingly it is possible to improve the high reliability in the system.

Figure 20:
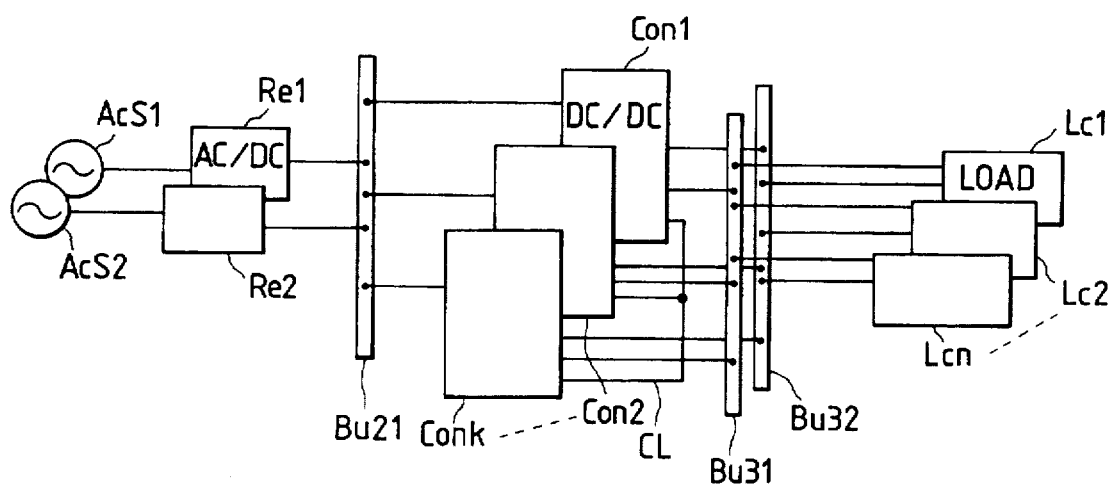
FIGS. 20 and 21 are block diagrams showing further examples in which a power supply system according to the present invention is adapted to a computer.

FIG. 20 shows an application of the power supply system according to the present invention to a computer system Cp1. The DC voltage outputs from the alternating current supplies AcS1 and Acs2 are supplied to the common bus Bu21 through the rectifying units Re1 and Re2. The common bus Bu21 is connected to the converters Con1–Conk. The outputs of the converters Con1–Conk are connected to the loads (computer Lc1 Lcn) through the common buses Bu31 and Bu32. The converters Con1–Conk are connected by the control line CL and maximum current control is carried out.

With the above stated construction, from the alternating current supply to the loads the matrix construction is formed by a minimum construction, thereby the power supply system having simple construction and high reliability can be obtained.

Figure 21:
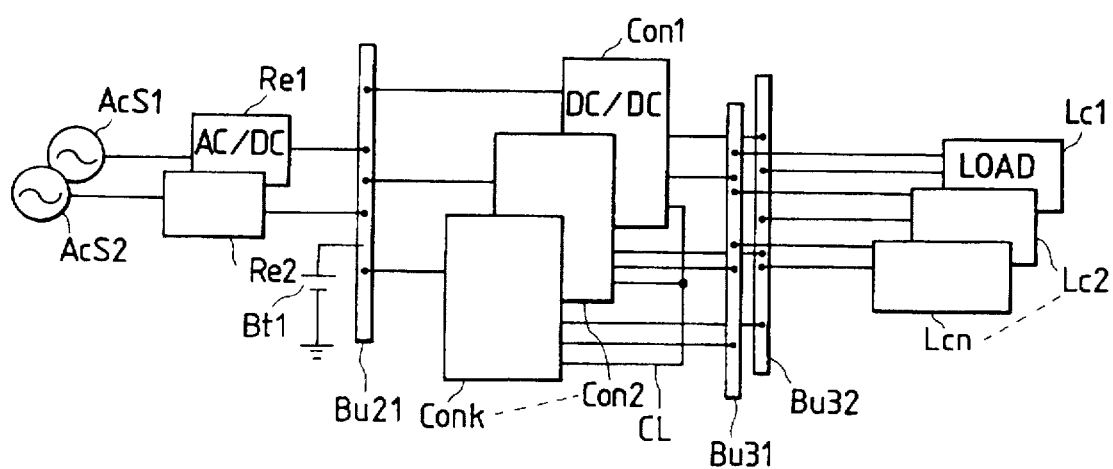

FIG. 21 shows a further improvement of the reliability for the power supply system shown in FIG. 20. In the power supply system construction shown in FIG. 21, the battery Bt1 supplies a DC voltage to the common bus Bu21. With this construction, even when the AC power supply fails, it can continue to operate by the battery; thereby the power supply system having high reliability can be obtained.

As stated in above, according to the present Invention, the current output of each of the plural converters is detected, and maximum current control system is carried out, in which the output current of each converter is matched to the maximum current among the detected current values.

During parallel operation, even when the converter fails, and its output current value falls to zero, the remaining converters can be partially charged to the load.

Further, the common bus is arranged between the plural converters and the plural loads, and by making a certain relationship between the converters and the loads redundant operation having a high reliability in the power supply system can be attained. Further, the plural alternating current inputs having the redundant in the power supply system can be controlled by only one power factor improvement circuit construction.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A power supply system comprising:

a plurality of electric power converters, each for converting an input current to a direct current having a predetermined voltage, outputs of said converters being connected in parallel to supply electric power to a load;

a current detector means for detecting a magnitude of output current of each of said converters;

a maximum current detector for detecting magnitude of a maximum output current value among output current values of said converters detected by said current detection means;

a control for controlling said converters to match said detected output current values of each of said converters to said maximum output current value; and a voltage value control means for detecting output voltage values of said converters and for controlling said output voltage values of each of said converters to have predetermined values;

wherein said voltage value control means comprises a comparison means for comparing said maximum output current value with output current values of each of said converters, and each of said output voltage values of said converters is controlled to reduce a difference between said detected maximum output current value of said converter and said detected output current value of each said converter to zero, whereby output current values of said converters is the same as said maximum output current value.

2. A power supply system according to claim 1, wherein each of said converters comprises a transformer to convert alternating or direct current to direct current having a predetermined voltage; and the power supply system comprises further, a current value detection means for detecting a current value flowing in a secondary coil of said transformer;

a respective current value detection circuit for detecting a DC output current value of said respective converter;

a maximum current value detection circuit for comparing current values from said respective current value detection means of said respective converters and for detecting a maximum current value among said compared current values; and an addition means for adding a difference between said maximum current value of said respective selected converter and said output current value of said respective selected converter to said voltage control means.

3. A power supply system according to claim 1 having outputs from said plurality of converters connected in parallel supply a load, wherein:

when an allowance failure number of said system is expressed by h, and the number of said converters connected in parallel is expressed by k, a formula being selected so as to satisfy a relationship $(2+2h) \leq k \leq (8+2h)$.

4. A power supply system according to claim 1, further comprising an AC power supply connected to a first common bus;

a plurality of rectifying circuits having AC inputs connected to said first common bus;

a second common bus connected to outputs of said plurality of rectifying circuits;

said plurality of electric power converters comprising a plurality of DC/DC converters having DC inputs connected to said second common bus; and a third common bus connected to predetermined DC voltage outputs of said plurality of DC/DC converters;

said DC voltage outputs of said plurality of DC/DC converters being supplied to a plurality of loads through said third common bus.

5. A power supply system according to claim 1, further comprising:

a plurality of first common buses connected to supply electric power to a first group of plural loads, said first common buses forming a first cluster;

a second cluster comprising a plurality of second common buses connected to said first cluster;

a plurality of third common buses connected to said second cluster; and said plurality of electric power converters having DC outputs connected to said second common bus.

6. A power supply system according to claim 1, wherein said plurality of electric power converters comprises a converter group having a plurality of DC/DC converters, said system further comprising:

a plurality of rectifying units;

a plurality of AC power supplies; and a plurality of third common buses connected between DC outputs of said plurality of DC/DC converters and a load group having a plurality of loads;

a plurality of second buses connected between DC inputs of said plurality of converters and outputs of said plurality of rectifying units; and a plurality of third buses connected between inputs of said plurality of rectifying units and said plurality of AC power supplies.

7. A power supply system for supplying DC electric power to plural loads which are divided into plural groups, said power supply system comprising:

a plurality of first common buses connected to supply electric power to a first group of said plural loads, said first common buses forming a first cluster;

a second cluster comprising a plurality of second common buses connected to said first cluster;

a plurality of third common buses connected to said second cluster; and a first switching element connecting said first common buses and said second common buses;

a second switching element connecting said second common buses and said third common buses; and a plurality of converters having DC outputs connected to said third common buses.

8. A power supply system according to claim 7, further comprising:

a third cluster for supplying electric power to said plurality of second common buses comprising said second cluster; wherein
by providing common buses classified x degree, x being an integer, said plural converters are connected to a highest classified degree common bus.

9. A power supply system according to claim 7, wherein:
each of said first common bus and said second common bus has a single around side;
plural non-ground sides of each of said first common bus and said second common bus are connected in parallel; and
electric power is supplied through said plural classified common buses.

10. A power supply system according to claim 7, further comprising:
first and second fuses connected to an anti-ground side of each of said first common bus and said second common bus; wherein
a capacity of said fuse of said first common bus is smaller than a capacity of said fuse of said second common bus.

11. A power supply system according to claim 7, further comprising:
a switch for cutting off a supply of the electric power at a non-ground side of each of said first common bus and said second common bus.

12. A power supply according to claim 7, further comprising:
a condenser connected between a ground side and an anti-ground side of each of said first common bus and said second common bus.

13. A power supply system according to claim 7, further comprising:
8·x magnetic disk array, x being an integer, connected to said first common bus, supplying the electric power.

14. A power supply system according to claim 13, further comprising:
a diode connecting said first common bus and said magnetic disk array.

15. A power supply system according to claim 7, wherein 8·x first clusters are arranged, x being an integer.

16. A power supply system according to claim 13, wherein
a first bit is recorded on a first cluster relative to a bit direction of data being recorded on a magnetic disk apparatus, a second bit is recorded on a second cluster, and an n number bit is recorded on nth number cluster.

17. A power supply system for use in an electric car, comprising:
a plurality of motors for driving the electric car;
a plurality of electric power converters; and
a plurality of battery power supplies; wherein
said plurality of motors and said plurality of converters are connected through a plurality of common buses;
said plurality of converters and plurality of battery power supplies are connected through at least one common bus; and
said plurality of electric power converters comprises a plurality of electric power converters for converting one of an alternating current and a direct current to a direct current having a predetermined voltage, outputs of said converters being connected in parallel to supply electric power to a load;
a current detector means for detecting a magnitude of output current of each of said converters;

a maximum current detector for detecting magnitude of a maximum output current value among output current values of said converters detected by said current detection means;
a control for controlling said converters to match said detected output current values of each of said converters to said maximum output current value; and
a voltage value control means for detecting output voltage values of said converters and for controlling said output voltage values of each of said converters to have predetermined values;
wherein said voltage value control means comprises a comparison means for comparing said maximum output current value with output current values of each of said converters, and each of said output voltage values of said converters is controlled to reduce a difference between said detected maximum output current value of said converter and said detected output current value of each said converter to zero, whereby output current values of said converters is the same as said maximum output current value.

18. A power supply for use in a computer system having a plurality of computers, comprising:
a plurality of converters for supplying electric power to said plurality of computers;
a plurality of rectifying units; and
a plurality of AC power supplies; wherein
said plurality of computers and said plurality of converters are connected through plural common buses;
said plurality of converters and said plurality of rectifying units are connected through at least one common bus; and
said plurality of converters comprises
a plurality of electric power converters for converting one of an alternating current and a direct current to a direct current having a predetermined voltage, outputs of said converters being connected in parallel to supply electric power to a load;
a current detector means for detecting a magnitude of output current of each of said converters,
a maximum current detector for detecting magnitude of a maximum output current value among output current values of said converters detected by said current detection means;
a control for controlling said converters to match said detected output current values of each of said converters to said maximum output current value; and
a voltage value control means for detecting output voltage values of said converters and for controlling said output voltage values of each of said converters to have predetermined values;
wherein said voltage value control means comprises a comparison means for comparing said maximum output current value with output current values of each of said converters, and each of said output voltage values of said converters is controlled to reduce a difference between said detected maximum output current value of said converter and said detected output current value of each said converter to zero, whereby output current values of said converters is the same as said maximum output current value.

19. A power supply system for supplying DC electric power to plural loads which are divided into plural groups, said power supply system comprising:

a plurality of first common buses connected to supply electric power to a first group of said plural loads, said first common buses forming a first cluster;

a second cluster comprising a plurality of second common buses connected to said first cluster;

a plurality of third common buses connected to said second cluster;

a plurality of converters having DC outputs connected to said third common buses; and a voltage value control means for detecting output voltage values of said converters and for controlling said output voltage values of each of said converters to have predetermined values.

* * * * *